United States Patent
Tateyama

(10) Patent No.: US 10,175,432 B2
(45) Date of Patent: Jan. 8, 2019

(54) OPTICAL PATH CHANGE ELEMENT AND OPTICAL COUPLING DEVICE

(71) Applicant: Konica Minolta, Inc., Tokyo (JP)

(72) Inventor: Tadao Tateyama, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/526,891

(22) PCT Filed: Nov. 13, 2015

(86) PCT No.: PCT/JP2015/081933
§ 371 (c)(1),
(2) Date: May 15, 2017

(87) PCT Pub. No.: WO2016/080296
PCT Pub. Date: May 26, 2016

(65) Prior Publication Data
US 2017/0322382 A1   Nov. 9, 2017

(30) Foreign Application Priority Data
Nov. 18, 2014   (JP) .................................. 2014-233401

(51) Int. Cl.
*G02B 6/42*   (2006.01)
*G02B 6/26*   (2006.01)

(52) U.S. Cl.
CPC .......... *G02B 6/4214* (2013.01); *G02B 6/264* (2013.01); *G02B 6/425* (2013.01); *G02B 6/4244* (2013.01); *G02B 6/4251* (2013.01); *G02B 6/4292* (2013.01)

(58) Field of Classification Search
None
See application file for complete search history.

(56) References Cited

U.S. PATENT DOCUMENTS 5,953,477 A * 9/1999 Wach ................. A61B 5/14546
                                                          385/115
6,115,521 A * 9/2000 Tran ..................... G02B 6/4214
                                                          385/33

(Continued)

FOREIGN PATENT DOCUMENTS

JP   2001-051162 A   2/2001
JP   2001-174671 A   6/2001

(Continued)

OTHER PUBLICATIONS

International Search Report issued in PCT/JP2015/081933 dated Jan. 12, 2016 (3 pages).

(Continued)

*Primary Examiner* — Tina M Wong
(74) *Attorney, Agent, or Firm* — Osha Liang LLP

(57) ABSTRACT

An optical path change element includes a first facet that receives incidence of light beams outgoing from outgoing portions of a first optical element, a second facet that has a predetermined radius of curvature and is provided with a reflection face to reflect the incident light beams from the first facet, and a third facet causing the light beams reflected on the reflection face to outgo to the incident portions of a second optical element. The second facet has protruded faces spaced from the reflection faces. Virtual planes tangent to the protruded faces are defined. At least one of the virtual planes covers the reflection face without being tangent to the reflection face and being parallel with a tangent plane at an arbitrary point of the reflection face.

20 Claims, 15 Drawing Sheets

(56) References Cited

U.S. PATENT DOCUMENTS

| | | | | |
|---|---|---|---|---|
| 6,205,274 B1* | 3/2001 | Zhou | G02B 6/4214 | 385/36 |
| 6,813,418 B1* | 11/2004 | Kragl | G02B 6/4214 | 385/39 |
| 6,965,714 B2* | 11/2005 | Brock | G02B 6/42 | 385/33 |
| 7,248,768 B2* | 7/2007 | Jeon | G02B 6/10 | 385/39 |
| 8,043,877 B2* | 10/2011 | Badehi | G02B 6/10 | 438/29 |
| 8,240,865 B2* | 8/2012 | Park | G02F 1/133603 | 362/97.1 |
| 8,559,774 B2* | 10/2013 | Shacklette | G02B 6/3522 | 385/16 |
| 8,620,122 B2* | 12/2013 | Meadowcroft | G02B 6/4286 | 385/14 |
| 8,737,784 B2* | 5/2014 | Kawai | G02B 6/4292 | 385/47 |
| 8,939,657 B2* | 1/2015 | Hung | G02B 6/42 | 385/89 |
| 9,158,071 B2* | 10/2015 | Nishimura | G02B 6/32 | |
| 9,389,375 B2* | 7/2016 | Kanke | G02B 6/4214 | |
| 9,435,963 B2* | 9/2016 | Charbonneau-Lefort | G02B 6/4206 | |
| 9,529,162 B2* | 12/2016 | Danley | G02B 6/4214 | |
| 9,588,308 B1* | 3/2017 | Wu | G02B 6/4214 | |
| 9,638,873 B2* | 5/2017 | Bhagavatula | G02B 6/4214 | |
| 9,726,825 B2* | 8/2017 | Hung | G02B 6/32 | |
| 2004/0234210 A1* | 11/2004 | Nagasaka | G02B 6/4214 | 385/88 |
| 2007/0140628 A1* | 6/2007 | Ebbutt | G02B 6/3644 | 385/89 |
| 2007/0183724 A1* | 8/2007 | Sato | G02B 6/4249 | 385/89 |
| 2008/0170822 A1* | 7/2008 | Bae | G02B 6/4214 | 385/18 |
| 2011/0317959 A1* | 12/2011 | Ohta | G02B 6/4214 | 385/38 |
| 2013/0183724 A1* | 7/2013 | Ohara | C12N 9/99 | 435/100 |

FOREIGN PATENT DOCUMENTS

| | | |
|---|---|---|
| JP | 2010-224513 A | 10/2010 |
| JP | 2013-235243 A | 11/2013 |

OTHER PUBLICATIONS

Written Opinion of the International Searching Authority issued in PCT/JP2015/081933 dated Jan. 12, 2016 (3 pages).

* cited by examiner

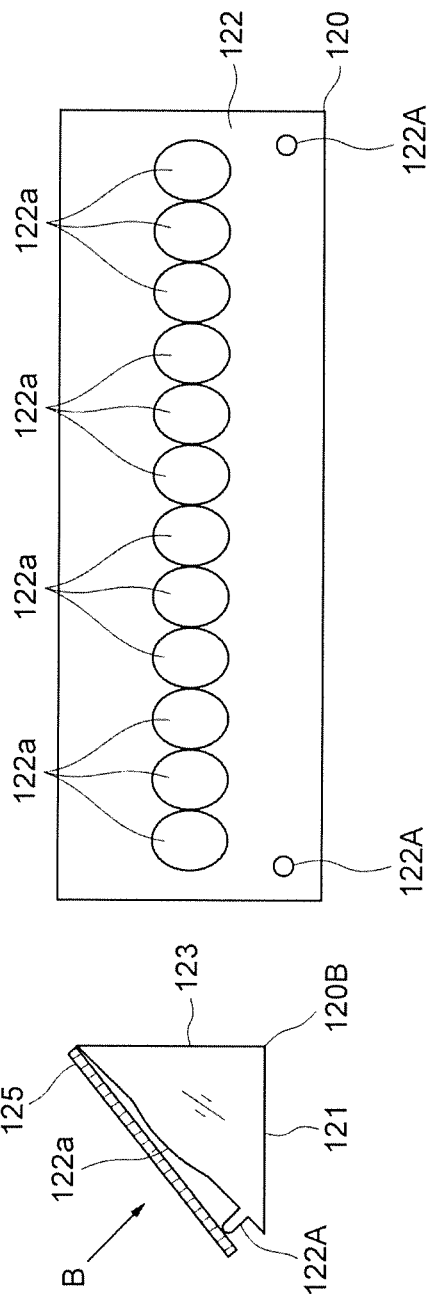

FIG.13A  FIG.13B  FIG.13C
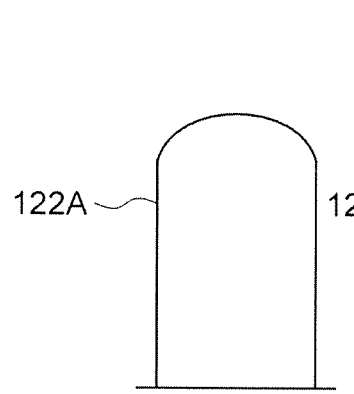
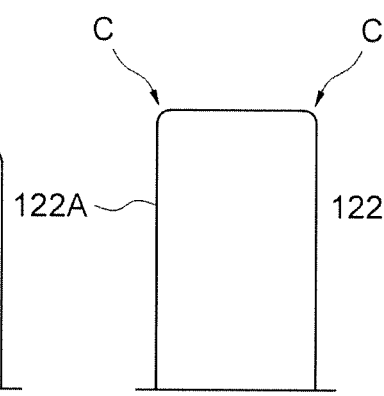
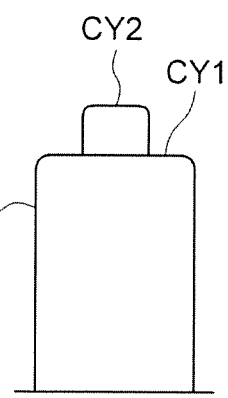
FIG.14
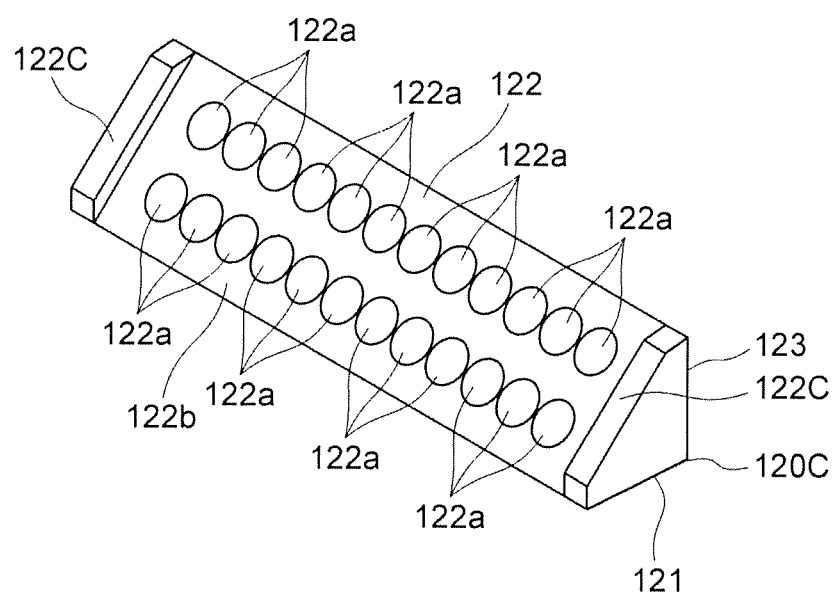

OPTICAL PATH CHANGE ELEMENT AND OPTICAL COUPLING DEVICE

TECHNICAL FIELD

The present invention pertains to an optical path change element for an optical coupling device configured to perform optical coupling between optical elements instanced by optical fibres, and to the optical coupling device using this optical path change element.

BACKGROUND ART

A variety of information/signal processing apparatuses including a network equipment instanced by a router, a server, and a large-sized computer, large-scaling and acceleration of information/signal processing are in an active phase. In these apparatuses, signal transmissions between a CPU (Central Processing Unit) and a memory on a circuit board, between wiring boards and between devices (racks) have hitherto been conducted via electric wiring. However, a so-called optical interconnection launches into actual introduction, in which the signals are transmitted optically by using optical fibres replacing the electric wiring as transmission paths owing to superiority in terms of a transmission speed, a transmission capacity, power consumption, radiation from the transmission path, and interference of electromagnetic waves with the transmission path.

Such an optical interconnection involves using, as main optical components, an optical transmission module including a light emitting element of converting electric signals into optical signals and transmitting the optical signal, and an optical reception module including a light receiving element of receiving and converting the optical signals into the electric signals, or an optical transmission/reception module having both of functions. These modules are generically termed optical modules.

Large-capacity communications are enabled by transmitting the optical signals in parallel between the optical modules via a transmission channel. In many cases, the optical fibres are used as the transmission channel for transmitting and receiving the optical signals between the optical modules. Hence, generally an optical coupling device is employed for optical coupling between the optical fibre and the optical module.

Incidentally, the optical fibre has basically flexibility and is therefore allowed to be bent and slackened to some degree. The general optical fibre is, however, prescribed in minimum diameter of an allowable flexure for ensuring transmission efficiency of light. Accordingly, a restriction of an installation space requires a flexure equal to or smaller than the minimum diameter, in which case there is used an optical coupling device configured to conduct the optical coupling by cutting the optical fibre and bending an optical path of light beams transmitted between the cut optical fibres. The use of this optical coupling device leads efficient reception on the whole and enhances the optical transmission efficiency as the case may be. A merit of the optical coupling device may likewise occur also in the optical coupling between the light emitting element and the optical fibre or between the optical fibre and the light receiving element without being limited to between the optical fibres. Herein, the light emitting element, the light receiving element and the optical fibre are generically termed optical elements.

For performing the optical coupling between the optical elements, the optical coupling device involves using an optical connector having a structure to bend the optical path in some cases. A PT (Photonic Turn) optical connector (standardized by JPCA-PE03-01-06S) configured to deflect an optical axis through 90° within the connector is utilized as the optical connector such as this.

The PT optical connector is a board packaging type optical connector for optically coupling a multicore optical fibre instanced by a multicore fibre tape core wire to the optical element on a flexible wiring board. Patent Document 1 describes an optical path change element, applicable to the PT optical connector, to bend the optical path of the multicore fibre.

CITATION LIST

Patent Literature

PTL 1: JP2013-235243 A

SUMMARY OF INVENTION

Technical Problem

The block-shaped optical path change element disclosed in Patent Document 1 includes aspherical reflection faces formed in a V-shaped groove in an upper surface. End faces of the multicore optical fibre inserted into the optical path change element in a horizontal direction are in a face-to-face relationship with respective aspherical reflection faces. On the other hand, a plurality of lenses provided on a lower face of the optical path change element is in the face-to-face relationship with a plurality of light emitting elements (or light receiving elements) provided in the optical module. The light beams emitted from the respective light emitting elements of the optical module are, after being collimated by the lenses, reflected by the corresponding aspherical reflection faces and converged at the end faces of the optical fibre.

By the way, the general optical coupling device is provided on each of boards inserted as a stack into a rear surface of the server and other equivalent apparatuses in many cases. It is therefore said preferable to downsize the optical coupling device to the greatest possible degree for integrating the boards in order to facilitate saving a space. However, the optical path change element of Patent Document 1 is configured so that the light beams entering the aspherical reflection faces are to be reflected by internal reflection based on a difference in refractive index between a material composing the aspherical reflection face and the air, resulting in an apprehension that the refractive index decreases due to occurrence of scattering and other equivalent phenomena when the aspherical reflection faces are damaged. It is therefore considered that the aspherical reflection faces are provided in V-shaped groove with a difficulty of being damaged in the optical coupling device of Cited Document 1. Such a problem, however, arises that the optical path change element is scaled up by a block shape because of providing the V-shaped groove. Further, there is a possibility that the aspherical reflection faces are not only damaged but also dewed with moistures and attached with foreign matters. When dewed with the moistures and attached with the foreign matters, a reflection condition changes, and deterioration of the material is easy to occur, whereby light usage efficiency becomes easy to decrease. As a result, there is an apprehension that accuracy of transmitting information decreases. To cope with this apprehension, though examining film formation on the aspherical reflection face, in the case of the optical path change element of Cited Document 1, after molding the aspherical reflection faces within the V-shaped groove, minute film forming particles flying straight from outside are shadowed by the V-shaped groove in a step of forming the films on the aspherical reflection faces, and there is an apprehension that the uniform films are disabled from being formed on the aspherical reflection faces.

Next, a scheme of covering the upper surface of the optical path change element with a plate-shaped cover member is examined against the problem of being dewed with the moistures and attached with the foreign matters. The installation of the cover member has merits of reducing careless damages to the aspherical reflection faces and influence by deterioration with passage of time due to an environment. It is also feasible to restrain reflection films from being exfoliated and damaged particularly on the occasion of forming the reflection films on the aspherical reflection faces. However, when the optical path change element is, in addition to having the block shape, fitted with the cover member, the optical coupling device has a larger height from the board and might interfere with a neighboring board on the occasion of the use by stacking the boards. This causes an increase in interval between the boards, resulting in a factor for hindering the integration.

One or more embodiments of the present invention provide an optical coupling device and an optical path change element used therein, which are capable of ensuring downsizing while keeping stable coupling efficiency without depending on an external environment but do not hinder integration of boards when attached to the boards.

Means for Solving the Problems

To accomplish at least one of the objects described above, an optical path change element, in which one or more embodiments of the present invention are reflected, is configured to perform optical coupling between a first optical element including outgoing portions of light beams and a second optical element including incident portions of the light beams. The optical path change element includes: a first facet receiving incidence of the light beams outgoing from the outgoing portions of the first optical element; a second facet being configured to have a predetermined radius of curvature and being provided with a reflection face to reflect the incident light beams from the first facet; and a third facet causing the light beams reflected on the reflection face to outgo to the incident portions of the second optical element, in which the second facet has protruded faces spaced from the reflection faces, and, when defining virtual planes tangent to the protruded faces, at least one of the virtual planes covers the reflection face without being tangent to the reflection face, and is parallel with a tangent plane at an arbitrary point of the reflection face.

According to the optical path change element, the second facet is formed with the protruded faces spaced from the reflection faces. Hence, e.g., when molding the reflection faces, an adverse influence is restrained from being exerted on a shape of the reflection face due to existence of the protruded face, and the reflection faces can be formed at high accuracy. Further, in the case of forming the reflection film on the reflection face by CVD (Chemical Vapor Deposition), sputtering, vacuum deposition and other equivalent methods and forming a functional film instanced by hard coat on the reflection face, it is possible to restrain the apprehension that the protruded face forms a shadow over the reflection face when forming the film and to form a more uniform film. On the occasion of preserving or carrying the optical path change element, the protruded face contacts an installation surface in advance when placing the optical path change element in a case with the reflection face being lowered, whereby it is possible to restrain the apprehension that the reflection face contacts the installation surface and to restrain the reflection face from being damaged and the reflection film and the functional film from being exfoliated when forming these films. Moreover, in the virtual planes tangent to three or more points on the second face with at least one of these points being tangent to the protruded face, at least one virtual plane is parallel with the tangent plane at the arbitrary point of the reflection face without being tangent to the reflection face. Therefore, even in the case of providing the cover member along the virtual plane to protect, e.g., the reflection face, the cover member is restrained from contact the reflection face, and the reflectivity thereof can be kept without damaging the reflection face. Further, the cover member is not excessively separated from the reflection face, and hence the space receiving the reflection faces can be minimized, and a size of the optical path change element inclusive of the cover member can be restrained small, resulting in being suited particularly to the optical coupling device. It may be sufficient that the cover member has a flat face superposed on the virtual plane, thereby enabling a simple configuration to be attained and leading to a reduction in cost.

The optical coupling device includes the optical path change element and the attachable/detachable optical connector connecting the optical path change element to the first optical element and/or the second optical element in an optical coupling enabled manner.

The use of the optical connector enables the optical coupling between the optical path change element and the first optical element and/or the second optical element, and makes these elements removable.

Effect of the Invention

According to one or more embodiments of the present invention, it is feasible to provide the optical coupling device and the optical path change element used therein, which are capable of ensuring downsizing while keeping the stable coupling efficiency without depending on the external environment but do not hinder the integration of boards when attached to the boards.

BRIEF DESCRIPTION OF DRAWINGS

FIG. 11 is a view illustrating an optical path change element 120A by way of a modified example applicable to the embodiment.

FIG. 12 is a view illustrating an optical path change element 120B by way of another modified example applicable to the embodiment; FIG. 12(a) is a sectional view taken along the optical axis in a state of fitting the cover member 125; and FIG. 12(b) is a view of the optical path change element as viewed in the direction of an arrow line B.

FIG. 13 is a side view illustrating a modified example of bosses 122A.

FIG. 14 is a view depicting an optical path change element 120C by way of another modified example applicable to the embodiment.

DESCRIPTION OF EMBODIMENTS

Figure 1:
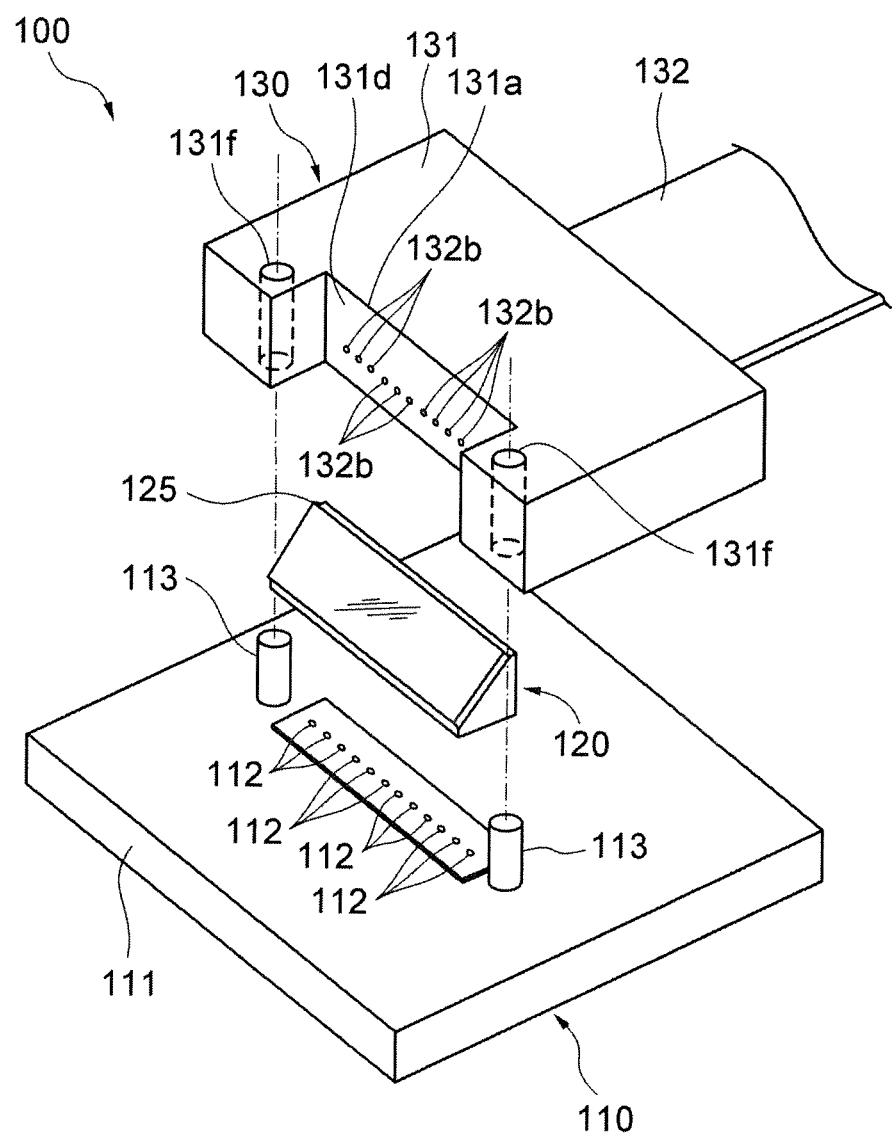
FIG. 1 is a perspective view illustrating an optical coupling device 100 in an exploded state according to a first embodiment.
Figure 2:
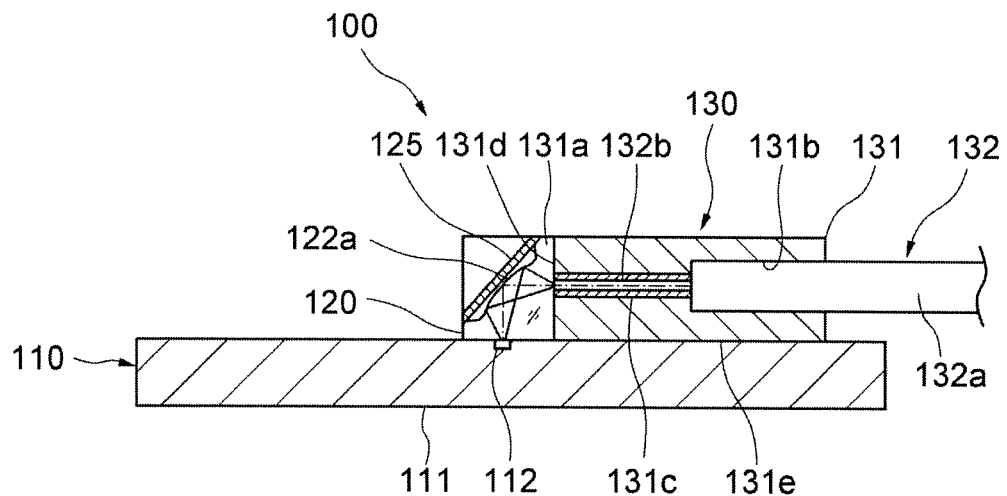
FIG. 2 is a sectional view of the optical coupling device 100, which view is taken along an optical axis thereof.
Figure 3:
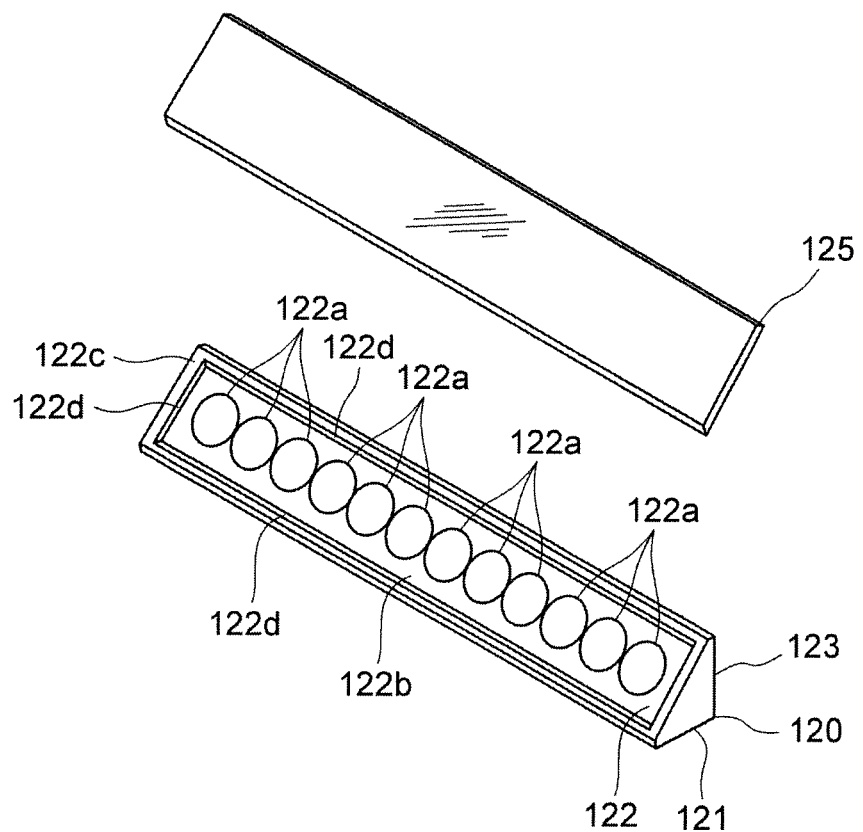
FIG. 3 is a perspective view of an optical path change element 120 used for the optical coupling device 100.
Figure 4:
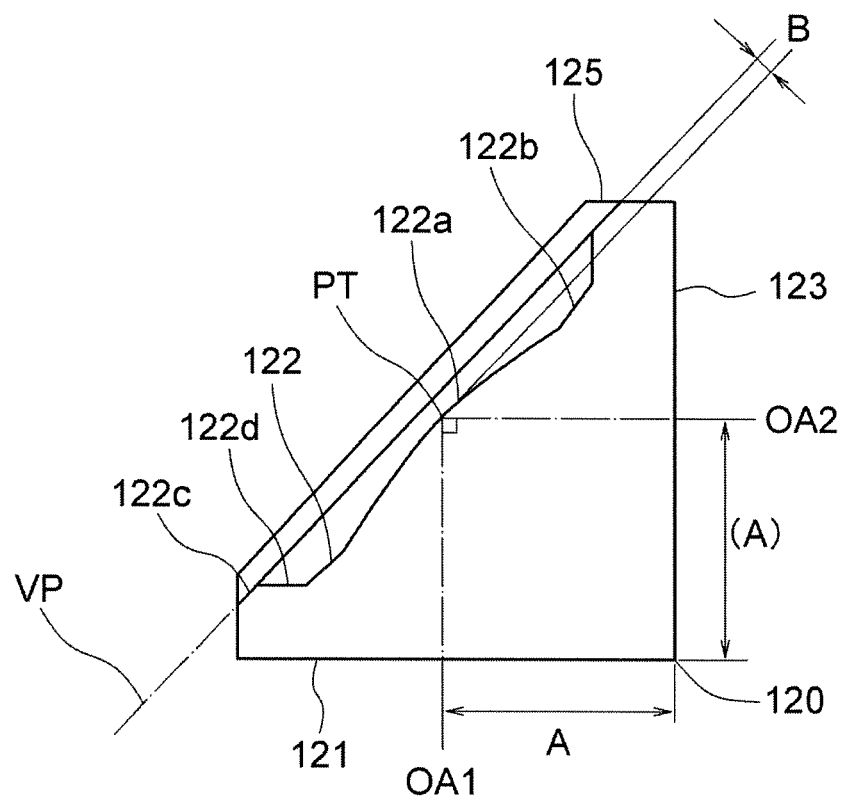
FIG. 4 is an enlarged sectional view of the optical path change element 120.

Embodiments will hereinafter be described with reference to the accompanying drawings. FIG. 1 is a perspective view illustrating an optical coupling device 100 in an exploded state according to a first embodiment. FIG. 2 is a sectional view of the optical coupling device 100, which view is taken along an optical axis thereof. FIG. 3 is a perspective view of an optical path change element 120 used for the optical coupling device 100. FIG. 4 is an enlarged sectional view of the optical path change element 120. Some of the following configurations schematically illustrated in the views may be different from actual configurations in shape, dimension and other equivalents.

As depicted in FIGS. 1 and 2, the optical coupling device 100 is configured to include an optical module 110, the optical path change element 120, and an optical connector 130. The optical module 110 defined as a first optical element has herein a function of transmitting light, and is installable onto each of plural boards, which are stacked and inserted into a rear surface of a large capacity server and other equivalent apparatuses. The board itself may also be configured as the optical module 110. The optical module 110 is configured by aligning semiconductor lasers 112 of a Vertical-Cavity Surface Emitting Laser (VCSEL) type, which are defined as a plurality of light emitting elements (emission units), on a base plate 111 taking a rectangular shape and having a flat upper surface. Cylindrical pins 113 are disposed in the vicinities of both ends in an alignment direction of the semiconductor lasers 112. Note that peripheries of the semiconductor lasers 112 may be formed with rugged portions for positioning the optical path change element 120. A numerical aperture (NA) of the optical module 110 is 0.1 through 0.6.

The optical connector 130 including a body unit 131 composed of a resin is connected to an optical fibre 132 defined as a second optical element, and has a function of retaining this optical fibre 132.

Usable fibres as the optical fibre 132 are exemplified by a multi-mode optical fibre of a full quartz type and a single-mode optical fibre. As a type of the optical fibre 132, e.g., a single-core optical fibre may be employed, and a multi-core optical fibre tape (ribbon) including a plurality of optical fibres is, however, herein used.

The body unit 131 is formed in a thick rectangular plate-like shape, and has a recessed portion 131a formed by notching one side in a rectangular shape as viewed from above in FIG. 1. As illustrated in FIG. 2, the body unit 131 has an insertion hole 131b formed on a side opposite to the recessed portion 131a and receiving insertion of the optical fibre 132. The insertion hole 131b has a broad rectangular section enabled to receive a protection unit 132a serving as a cover of the optical fibre 132. A plurality of through-holes 131c is formed extending from a bottom face of the insertion hole 131b to the recessed portion 131a. A front end portion (incidence portion) of a fibre strand 132b with the optical fibre 132 being uncovered is inserted into the through-hole 131c.

A bottom face 131d of the recessed portion 131a, from which the through-hole 131c is exposed, is orthogonal to a lower face 131e of the body unit 131. As illustrated in FIG. 1, a couple of circular openings 131f each having the same diameter as that of the pin 113 are formed on both sides with the recessed portion 131a being interposed therebetween.

In FIGS. 3 and 4, the optical path change element 120 is integrally formed of the resin or glass as will be described later on. The optical path change element 120 takes an elongated triangular prism-like shape, and has a first facet 121, a second facet 122 and a third facet 123. The first facet 121 is orthogonal to the third facet 123. Note that a size of the optical path change element 120 in a direction of an optical axis is preferably equal to or smaller than 10 mm in terms of its being downsized. The size thereof is set further preferably equal to or smaller than 5 mm in terms of enabling the size to be smaller than a minimum diameter of the optical fibre when bent.

The first facet 121 is flat and has a function of receiving incidence of light fluxes emitted from the semiconductor lasers 112 of the optical module 110. The second facet 122 includes a plurality of reflection faces 122a provided in alignment, a flat linking face 122b formed along peripheries of the reflection faces 122a, and rectangular protruded faces 122c formed along an outer periphery of the second facet 122 in a way that surrounds a periphery of the linking face 122b. It is preferable that inclined faces 122d are formed between the linking faces 122b and the protruded faces 122c. The third facet 123 is flat and has a function of allowing permeation of the light fluxes reflected from the reflection faces 122a.

Each of the reflection faces 122a has the same shape protruding from the linking face 122b. To be specific, the reflection face 122a takes an ellipse shape as viewed from the front, and has an anamorphic free-form surface enabling the reflection of a conical convergent light flux by deflecting the optical axis through 90° upon incidence of a conical divergent light flux. In the example of FIG. 3, the surface is a toroidal surface (which is the anamorphic surface in a broad sense) taking the ellipse shape in one direction. Aberrations can be thereby substantially eliminated. An alignment interval between the reflection faces 122a is equal to an alignment interval between the semiconductor lasers 112 and an alignment interval between fibre strands 132b inserted into the through-holes 131c. An alignment direction of the reflection faces 122a is orthogonal to a plane containing (covering) two optical axes of one reflection face 122a. Note that an angle (acute angle) made by a tangential plane of an outer peripheral edge of the reflection face 122a and the optical axis is normally equal to or smaller than 75 degrees. A distance between the protruded face 122c and the reflection face 122a is preferably equal to or larger than 0.05 mm in terms of not affecting a coupling efficiency.

A height of the protruded face 122c from the linking face 122b is uniform along the entire periphery but is larger than a protrusion quantity of the reflection face 122a. Accordingly, as illustrated in FIG. 4, when defining a virtual plane VP tangent to an entire periphery (which is herein a plane portion) of the protruded face 122c, it does not happen that the virtual plane VP is tangent to the reflection face 122a. The virtual plane VP is parallel to a tangential plane at an arbitrary point (which is a point PT on the optical axis in this example, and any point may, however, be sufficient as far as being inward of at least the outer peripheral edge of the reflection face 122a) of the reflection face 122a.

On one reflection face 122a in FIG. 4, let OA1 be the optical axis on the side of the optical module 110 and OA2 be the optical axis on the side of the optical connector 130. The optical axes OA1 and OA2 are orthogonal to each other on the reflection face 122a. Let A be a distance along the optical axis OA1 from the first facet 121 up to the reflection face 122a (or a distance along the optical axis from the third facet 123 up to the reflection face 122a) and B be a distance from the point PT on the optical axis OA1 of the reflection face 122a up to the virtual plane VP. The distances A, B satisfy the following mathematical expression. Note that the distance A is normally equal to or larger than 0.0625 mm but equal to or smaller than 2.9 mm.

$$B/A<1.0 \qquad (1)$$

The optical path change element 120 is configured by bonding a parallel plate type cover member 125 to the entire periphery of the protruded face 122c so as to be overlapped with the virtual plane VP. The cover member 125 is preferable when being a light shielding member, and is thereby enabled to restrain deterioration of the optical path change element 120 because of preventing penetration of the light coming from the outside into an interior of the lens. The cover member 125 is provided to thereby form a gap from the reflection face 122a, to thereby prevent the cover member 125 from damaging the reflection face 122a, and to thereby eliminate an apprehension, when a reflective film is formed on the reflection face 122a, of damaging this reflective film. Additionally, the cover member 125 can be provided so as to be overlapped with the virtual plane VP, and it is therefore feasible to contribute to the downsizing in a stacking direction when stacking the board provided with the optical coupling device 100. It is also feasible to protect the reflection face 122a from adverse influence instanced by adhesion of foreign matters in an external environment by the cover member 125 that seals the reflection face 122a in a hermetic space. It may also be available to prevent the adhesion of the foreign matters and moisture condensation by sealing a gap between the reflection face 122a and the virtual plane VP with a resin. It does not mean that the sealing based on the cover member 125 or the resin is to be invariably conducted, and it is, however, preferable to perform sealing based on the cover member 125 or the resin for the reason elucidated above. As illustrated in FIG. 4, it is preferable that the cover member 125 takes a shape not protruding outward from the optical path change element 120 when fitted to the optical path change element 120, thereby enabling the optical coupling device 100 to be downsized.

(Molding of Optical Path Change Element)

Figure 5A:
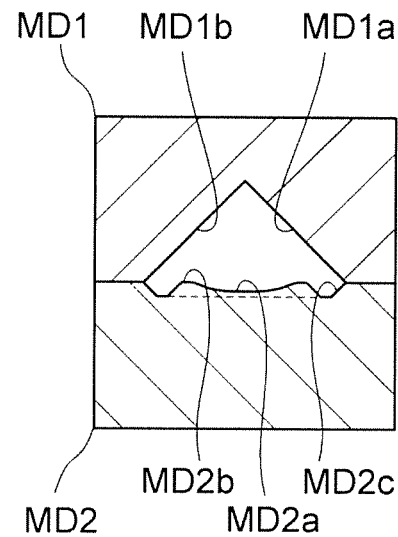
FIG. 5 is a diagram illustrating a step of molding the optical path change element by using a resin.

FIG. 5 is a diagram illustrating a step of molding the optical path change element by using the resin. As illustrated in FIG. 5(a), a first mold MD1 includes a V-grooved transfer face configured to have inclined faces MD1a, MD1b. On the other hand, a second mold MD2 includes an optical face transfer face MD2a, a linking face transfer face MD2b and a protruded face transfer face MD2c. Note that the protruded face transfer face MD2c is, as indicated by a dotted line, locally expanded on an edge face of the second mold MD2. The first mold MD1 and the second mold MD2 are closed except a gate in a clamped state at both ends in a vertical direction as viewed on a sheet surface.

As illustrated in FIG. 5(a), the first mold MD1 and the second mold MD2 are clamped so that a lower face of the first mold MD1 and an upper face of the second mold MD2 are tightly fitted together, and a resinous material fluxed from the unillustrated gate flows into cavities of the first mold MD1 and the second mold MD2. It is desirable hereat that a position of the gate exists anywhere within the end face (the end face indicated partly by the dotted line in FIG. 5 in the vertical direction as viewed on the sheet surface).

The first facet 121 of the optical path change element 120 is transfer-molded by the inclined face MD1a of the first mold MD1, and the third facet 123 is transfer-molded by the inclined face MD1b. On the other hand, the reflection face 122a of the optical path change element 120 is transfer-molded by the optical face transfer face MD2a of the second mold MD2; the linking face 122b is transfer-molded by the linking face transfer face MD2b; and the protruded face 122c is transfer-molded by the protruded face transfer face MD2c. The protruded face transfer face MD2c is spaced from the optical face transfer face MD2a and therefore has a small apprehension of exerting adverse influence on the reflection face 122a molded by the optical face transfer face MD2a when the protruded face 122c is molded by the protruded face transfer face MD2c, thereby enabling a shape of the reflection face 122a to be maintained at high accuracy.

Figure 5B:
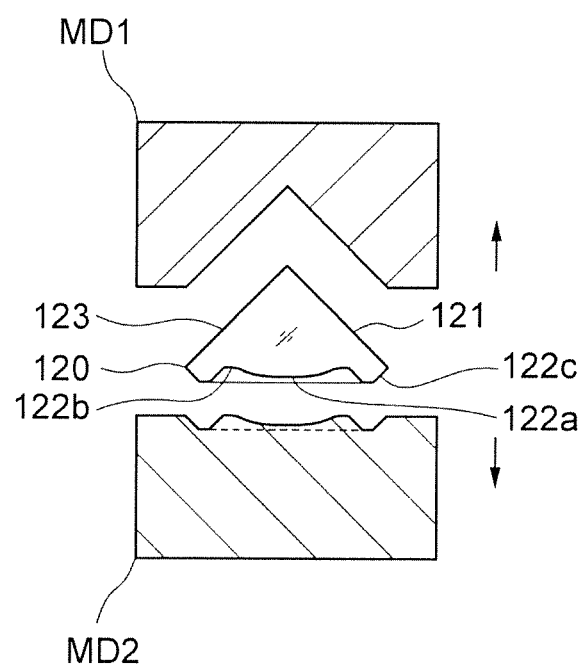

After hardening the resin material, as illustrated in FIG. 5(b), the molded optical path change element 120 can be taken out by mold-opening the first mold MD1 and the second mold MD2. According to the embodiment, the first facet 121 and the third facet 123 of the optical path change element 120 are flat facets, and hence the mold release can be easily attained even by using the single first mold MD1.

FIG. 6 is a diagram illustrating a step of molding the optical path change element by using a glass. The first mold MD1 and the second mold MD2 take substantially the same transfer face shape as the shape described above expect a gate.

Figure 6A:
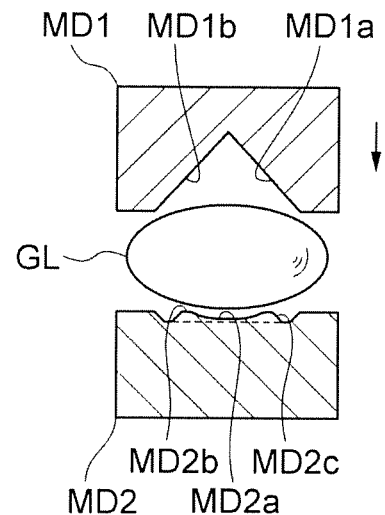
FIG. 6 is a diagram illustrating a step of molding the optical path change element by using a glass.
Figure 6B:
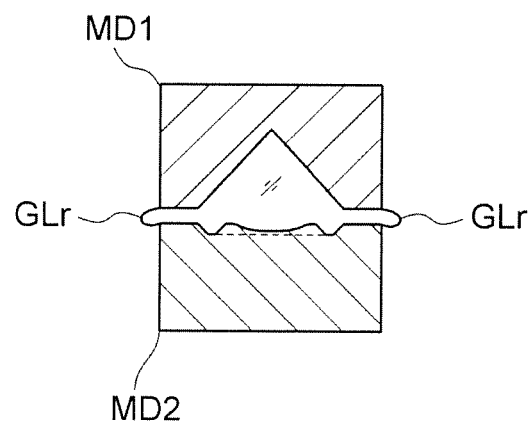

A molten glass GL is dropped down onto the second mold MD2 existing downward in a direction of gravity acceleration, and, as depicted in FIG. 6(a), when the first mold MD1 is moved closer to the second mold MD2, the dropped glass GL is press-deformed by the molds. An interval between the first mold MD1 and the second mold MD2 is determined at high accuracy by using an unillustrated jig. At this time, as illustrated in FIG. 6(b), the first first facet 121 of the optical path change element 120 is transfer-molded by the inclined face MD1a of the first mold MD1, and the third facet 123 is transfer-molded by the inclined face MD1b. On the other hand, the reflection face 122a of the optical path change element 120 is transfer-molded by the optical face transfer face MD2a of the second mold MD2; the linking face 122b is transfer-molded by the linking face transfer face MD2b; and the protruded face 122c is transfer-molded by the protruded face transfer face MD2c. however, a residue of the glass GL is excluded from between the molds and solidified. This solidified residual glass is termed an unnecessary glass GLr.

Figure 6C:
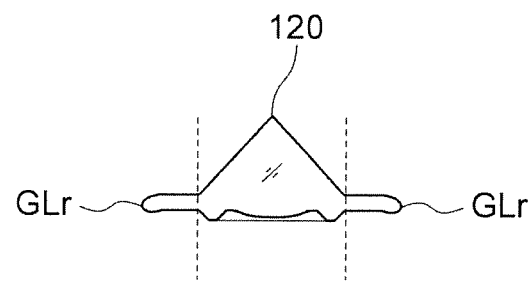

After hardening the glass, the first mold MD1 and the second mold MD2 are mold-opened to thereby enable the molded product to be taken out, and the unnecessary glass GLr is, however, attached thereto. Such being the case, as depicted in FIG. 6(c), the optical path change element 120 taking a final shape can be acquired by cutting the unnecessary glass GLr in a position indicated by a dotted line. Note that the molding, i.e., so-called liquid droplet molding of dropping the molten glass GL is herein exemplified, and there may, however, be used a molding method of inserting a glass preform in between metal molds and changing a shape while heating the preform.

After molding the optical path change element 120, e.g., a gold-based reflection film (equal to or larger than 90% in reflectivity) may be formed on the reflection face 122a by CVD (Chemical Vapor Deposition), sputtering, vacuum deposition and other equivalent methods.

(Assembly of Optical Coupling Device)

As illustrated in FIG. 1, the optical path change element 120 fitted with the cover member 125 is bonded to a predetermined position on the base plate 111 formed with the semiconductor lasers 112. The semiconductor lasers 112 are thereby disposed substantially at a center of the first facet 121 of the optical path change element 120. Hereat, it follows that outgoing faces of the semiconductor lasers 112 abut on the first facet 121 of the optical path change element 120.

Subsequently, an optical connector 130, to which the optical fibre 132 is assembled, is moved close to the base plate 111 from upward and is assembled so that the pins 113 are inserted into the circular openings 131f of the body unit 131. The fibre strands 132b inserted into the through-hole 131c are thereby disposed at the center of the third facet 123 of the optical path change element 120. Hereat, it follows that end faces of the fibre strands 132b of the optical fibre 132 abut on the third facet 123 of the optical path change element 120. The assembly of the optical coupling device 100 is thus completed. Note that the optical connector 130 is attachable and detachable to and from the base plate 111 by being fitted to and removed from the pins 113. It is to be noted that the fibre strands 132b are disposed at the center of the third facet 123 of the optical path change element 120 in the embodiment, and may also be disposed with a shift without being limited to the center.

(Operation of Optical Coupling Device)

In FIG. 2, when the semiconductor lasers 112 of the optical module 110 respectively emit light beams divergently upon power supply from an unillustrated actuation unit, outgoing fluxes enter the first facet 121 of the optical path change element 120, are then converted into convergent light beams simultaneously with a 90° deflection of an optical axis through total reflection (or reflection by the reflection film) on the corresponding reflection face 122a, further emerge from the third facet 123, are subsequently condensed at the end faces of the fibre strands 132b, and enter the optical fibre 132 therefrom. The light beams passing through inside the optical path change element 120 have no contact with the air, and can therefore avoid being affected by foreign matters to the greatest possible degree. It follows that such incident light beams are transmitted to an external optical module via the optical fibre 132. Optical coupling between the optical module 110 and the optical fibre 12 is thus performed by the optical coupling device 100.

A modified example of the embodiment is that photo diodes can be provided in the same array in place of the semiconductor lasers 112 in the optical module 110. In such a case, referring to FIG. 2, the light beams transmitted via the optical fibre 132 enter the third facet 123 of the optical path change element 120 divergently from the end faces of the fibre strands 132b, are then converted into the convergent light beams upon the total reflection (or the reflection from the reflection film) on the corresponding reflection face 122a, are condensed at the photo diodes by emerging further from the first facet 121, and can be optically detected here.

Figure 7:
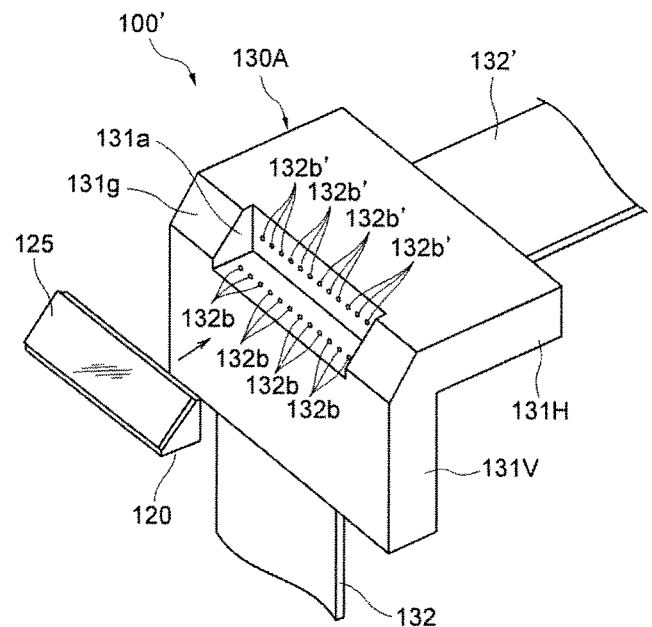
FIG. 7 is a perspective view illustrating an optical coupling device 100' in a decomposed state according to a second embodiment.
Figure 8:
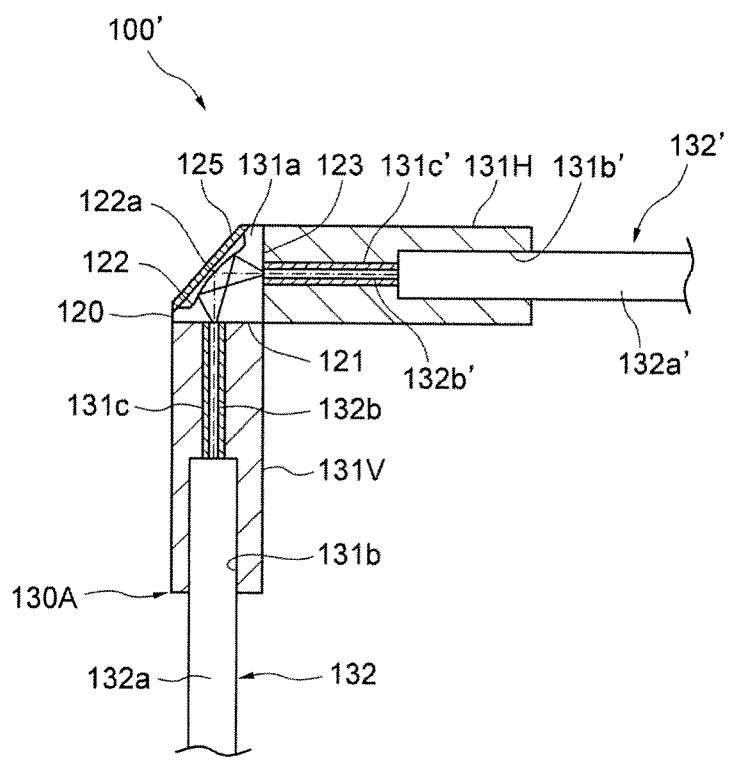
FIG. 8 is a sectional view, taken along the optical axis, of the optical coupling device 100'.

Next, an optical coupling device according to a second embodiment will be described. FIG. 7 is perspective view illustrating an optical coupling device 100' in a decomposed state according to the second embodiment. FIG. 8 is a sectional view, taken along the optical axis, of the optical coupling device 100'. The optical coupling device 100' according to the second embodiment is configured to include the optical path change element 120 and an optical connector 130A. The optical path change element 120 has the same configuration inclusive of the cover member 125 as the embodiment described above, and hence the repetitive explanations inclusive of the manufacturing steps will be omitted.

On the other hand, the optical connector 130A has such a shape that the body unit of the embodiment described above is connected at a right angle. To be specific, a body unit 131' is an L-shaped member including a vertical portion 131V and a horizontal portion 131H, and an intersecting portion therebetween is formed with a recessed portion 131a notched in an angular/cylindrical shape. Inclined faces 131g are formed by obliquely cutting external portions of the intersection portion between the vertical portion 131V and the horizontal portion 131H in a position of the cover member 125 of the fitted optical path change element 120. An insertion hole 131b receiving the insertion of the optical fibre 132 defined as a first optical element is, as illustrated in FIG. 8, formed on the side opposite (downward) to the recessed portion 131a of the vertical portion 131V. The insertion hole 131b has a rectangular section that is as broad as being receivable of a protecting portion 132a serving as a sheath of the optical fibre 132. A plurality of narrow through-holes 131c is formed extending from a bottom face of the insertion hole 131b toward the recessed portion 131a. Tips (outgoing portions) of the fibre strands 132b with the sheath being removed are inserted into the through-holes 131c. Note that a mode of mounting the optical path change element 120 in the L-shaped member including the vertical portion 131V and the horizontal portion 131H has been described in FIG. 7, and the optical path change element 120 may, however, be joined to the optical connector 130A by a butt joint method in terms of downsizing the device to the greatest possible degree, and may also be joined directly to first and second optical elements by another butt joint method without providing the optical connector 130A.

On the other hand, as in FIG. 8, an insertion hole 131b' receiving insertion of an optical fibre 132' defined as the second optical element is formed on the side opposite (rightward) to the recessed portion 131a of the horizontal portion 131H. The insertion hole 131b' has a rectangular section that is as broad as being receivable of a protecting portion 132a' serving as a sheath of the optical fibre 132'. A plurality of narrow through-holes 131c' is formed extending from a bottom face of the insertion hole 131b' toward the recessed portion 131a. Tips (incident potions) of fibre strands 132b' with the sheath being removed are inserted into the through-holes 131c'. A number of the fibre strands 132b is equal to a number of the fibre strands 132b', and an interval between the through-holes 131c is equal to an interval between the through-holes 131c'. It is desirable in terms of downsizing the device to the greatest possible degree that thicknesses of the vertical portion 131V and the horizontal portion 131H are set to such dimensions as not to protrude from the optical path change element 120.

(Assembly of Optical Coupling Device)

As illustrated in FIGS. 7 and 8, the optical fibre 132 is inserted into the vertical portion 131V of the optical connector 130, and the optical fibre 132' is inserted into the horizontal portion 131H, in which state the first facet 121 and the third facet 123 of the optical path change element 120 fitted with the cover member 125 are bonded to a face orthogonal to the recessed portion 131a. The fibre strands 132b, 132b' are thereby disposed at the centers of the first facet 121 and the third facet 123 of the optical path change element 120. Hereat, it follows that the end faces of the fibre strands 132b abut on the first facet 121 of the optical path change element 120, and the end faces of the fibre strands 132b' abut on the third facet 123. The assembly of the optical coupling device 100' is thus completed.

(Operation of Optical Coupling Device)

In FIG. 8, when the light beams are transmitted via the optical fibre 132, the light beams emerge respectively from the end faces of the fibre strands 132b, and the outgoing light fluxes are divergently incident on the first face 121 of the optical path change element 120, are then converted into the convergent light beams upon the total reflection (or the reflection on the reflection film) on the corresponding reflection face 122a, emerge further from the third facet 123, are then condensed at the end faces of the fibre strands 132b', and enter the optical fibre 132' therefrom. It follows that such incident light beams are further transmitted via the optical fibre 132'. The optical coupling between the optical fibres 132, 132' is thus performed by the optical coupling device 100'.

Figure 9:
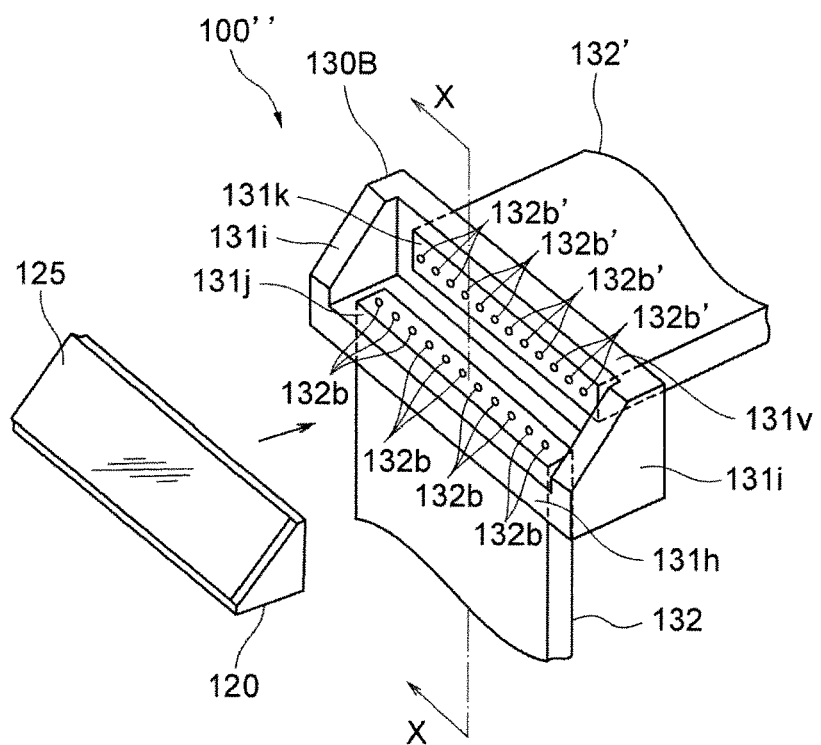
FIG. 9 is a perspective view illustrating an optical coupling device 100" in a decomposed state according to a third embodiment.
Figure 10:
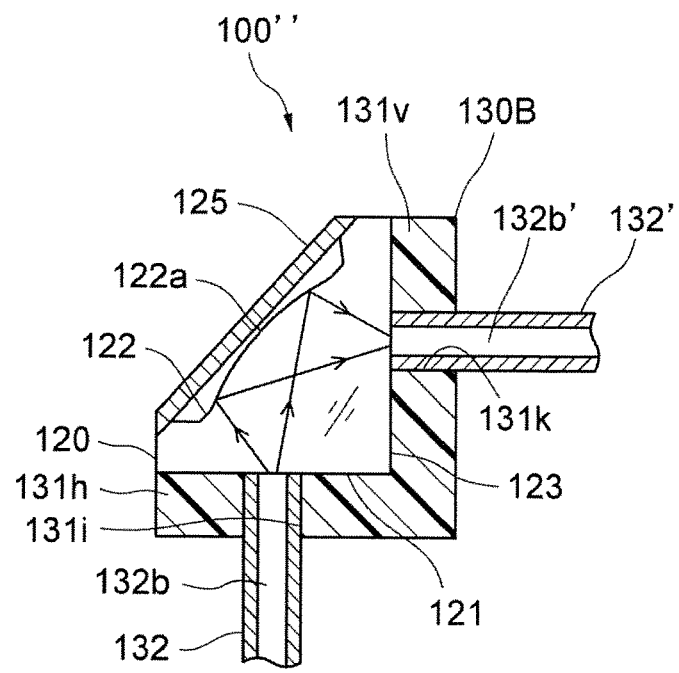
FIG. 10 is a sectional view of the optical coupling device 100" as viewed by cutting the device with a plane taken along an allowed line X-X in FIG. 9.

Next, an optical coupling device according to a third embodiment will be described. FIG. 9 is a perspective view illustrating an optical coupling device 100" in a decomposed state according to the third embodiment. FIG. 10 is a sectional view of the optical coupling device 100" as viewed by cutting the device with a plane taken along an allowed line X-X in FIG. 9. The optical coupling device 100" according to the third embodiment is configured to include the optical path change element 120 and an optical connector 130B. The optical path change element 120 has the same configuration inclusive of the cover member 125 as the embodiment described above, and hence the repetitive explanations inclusive of the manufacturing steps will be omitted.

On the other hand, the optical connector 130B takes an integral shape by joining a rectangular bottom plate 131h and a rectangular side plate 131v together at the right angle, and further joining triangular end plates 131i to both ends thereof in a longitudinal direction. The bottom plate 131h is formed with a rectangular opening 131j receiving insertion of the end portion of the optical fibre 132 defined as the first optical element, and the fibre strands 132b are exposed from within the rectangular opening 131j. On the other hand, the side plate 131v is formed with a rectangular opening 131k receiving insertion of the end portion of the optical fibre 132' defined as the second optical element, and the fibre strands 132b' are exposed from within the rectangular opening 131k. The rectangular openings 131k, 131j each have a function of positioning the fibre strands 132b, 132b' orthogonally to the first facet 121 and the third facet 123. The optical path change element 120 is fitted to the optical connector 130B in a way that abuts the first facet 121 on the bottom plate 131h and abuts the third facet 123 on the side plate 131v.

As depicted in FIG. 10, it is preferable in terms of scheming to downsize the optical coupling device 100" that widths of the bottom plate 131h and the side plate 131v are set to dimension to such a degree as not to protrude outwardly of the optical path change element 120. Note that the optical path change element 120 and the optical connector 130B can be molded of the resin and other equivalent materials as an integral molded product, as far as using slide metal molds and other equivalent molds. In the case of using normal metal molds, however, it may be better to form the optical path change element 120 and the optical connector 130B by post-processing without being formed when molding the rectangular openings 131k, 131j causing hindrance on the occasion of the mold release.

(Operation of Optical Coupling Device)

In FIG. 10, when the light beams are transmitted via the optical fibre 132, the light beams emerge respectively from the end faces of the fibre strands 132b, and the outgoing light fluxes are divergently incident on the first facet 121 of the optical path change element 120, are then converted into the convergent light beams upon the total reflection (or the reflection on the reflection film) on the corresponding reflection face 122a, emerge further from the third facet 123, are then condensed at the end faces of the fibre strands 132b', and enter the optical fibre 132' therefrom. It follows that such incident light beams are further transmitted via the optical fibre 132'. The optical coupling between the optical fibres 132, 132' is thus performed by the optical coupling device 100".

Figures 11A, 11B:
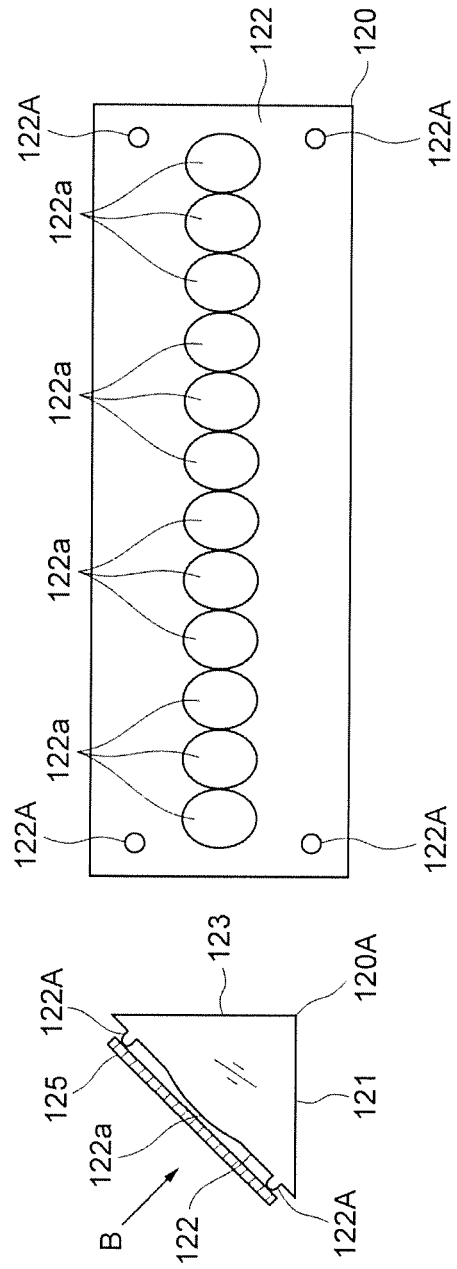
FIG. 11(a) is a sectional view taken along the optical axis in a state of fitting a cover member 125.
FIG. 11(b) is a view of the optical path change element as viewed in a direction of an arrow line B.

FIG. 11 is a view illustrating an optical path change element 120A by way of a modified example applicable to the embodiment described above. FIG. 11(a) is a sectional view taken along the optical axis in a state of fitting the cover member 125, and FIG. 11(b) is a view of the optical path change element 120A with the cover member 125 being removed as viewed in a direction of an arrow line B. In this modified example, bosses 122A each taking the same shape are formed as protruded faces at four corners of the second facet 122 of the optical path change element 120A. Referring to FIG. 11(a), a virtual plane passing through vertexes of the four bosses 122A is parallel with a tangent plane without being tangent to the reflection faces 122a of the optical path change element 120A. Accordingly, the cover member 125 taking a parallel flat shape can be disposed so as to be tangent to the vertexes of the four bosses 122A without interfering with the reflection faces 122a. In the modified example also, the virtual plane passing through the vertexes of the four bosses 122A is parallel with the tangent plane passing through points on the optical axes of all the reflection faces 122a. Note that the bosses 122A may take different shapes.

FIG. 12 is a view illustrating an optical path change element 120B by way of another modified example applicable to the embodiment described above. FIG. 12(a) is a sectional view taken along the optical axis in a state of fitting the cover member 125, and FIG. 12(b) is a view of the optical path change element 120B with the cover member 125 being removed as viewed in the direction of the arrow line B. In this modified example, the two bosses 122A each taking the same shape as a protruded face are formed in the vicinity of both ends of a lower edge of the second facet 122 of the optical path change element 120B. Referring to FIG. 12(a), a virtual plane tangent to the two bosses 122A is set further tangent to an upper edge of the second facet 122, thereby univocally determining a position. In such a state, the virtual plane is parallel with a tangent plane without being tangent to the reflection faces 122a of the optical path change element 120B. Such being the case, the cover member 125 taking the parallel flat shape can be disposed so as to be tangent to the two bosses 122A and the upper edge of the second facet 122 without interfering with the reflection faces 122a in a manner of being superposed on this virtual plane. In this modified example also, the virtual plane tangent to the two bosses 122A and the upper edge of the second facet 122 is parallel with the tangent plane passing through any of points on all the reflection faces 122a. Note that the virtual plane is statically stably positioned simply by being tangent to the three points on the second facet 122, and hence the protruded face may be provided in, e.g., one position.

FIG. 13 is a side view illustrating a modified example of the bosses 122A. The boss 122A usable in the embodiment described above may have a spherical head as depicted in FIG. 13(a), and may also take a configuration of providing chamfered portions C at external edges of an upper end taking a cylindrical shape as illustrated in FIG. 13(b), thereby facilitating formation of metal molds in the case of molding the optical path change element from the metal molds. As depicted in FIG. 13(c), the boss A may take a configuration of coaxially placing a small cylinder CY2 on a large cylinder CY1. For example, the cover member is formed with a hole and a notch to receive engagement of the small cylinder CY2, and the small cylinder CY2 is abutted on an upper face of the large cylinder CY1, thereby enabling the cover member to be positioned surely. It is desirable to provide two or more bosses 122A depicted in FIG. 13(c).

FIG. 14 is a view depicting an optical path change element 120C by way of still another modified example applicable to the embodiment described above. The optical path change element 120C includes the first facet 121 and the third facet 123 that are also flat. On the other hand, the second facet 122 includes: pluralities of reflection faces 122a aligned in two lines; the flat linking face 122b formed along peripheries of the reflection faces 122a; and a couple of protruded faces 122C each taking a trapezoidal shape and formed so as to pinch the second facet 122 from bilateral sides orthogonally to an arrangement direction of the reflection faces 122a. The cover member (unillustrated) taking the parallel flat shape is placed on the protruded faces 122C, in which state the parallelism with the tangent plane is attained without being tangent to the reflection faces 122a of the optical path change element 120C. Note that the protruded faces 122C may also be configured to pinch the reflection faces 122a from both sides in the vertical direction. The reflection faces 122a may be aligned in three or more lines and may also be arranged in zigzag.

According to the embodiments of the present invention discussed above, the first facet and the third facet of the optical path change element are formed flat to simplify a structure of the metal molds. However, the first facet and the third facet of the optical path change element are formed flat, in which case there is apprehension of requiring a labor for positioning the first element and the second element. Such being the case, the first facet or the third facet can be provided with a positioning portion in a manner that follows.

Figure 15:
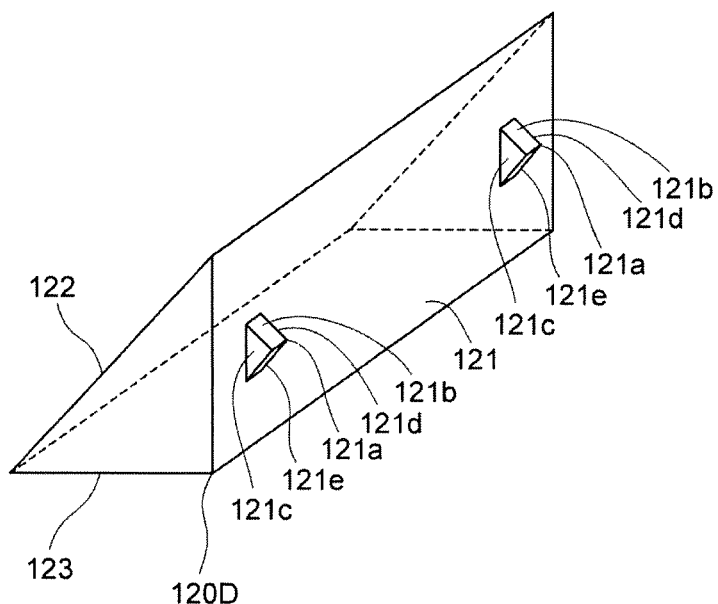
FIG. 15 is a view illustrating an optical path change element 120D by way of still another modified example applicable to the embodiment.

An optical path change element 120D illustrated in FIG. 15 is configured to omit the reflection faces and the protruded faces. In FIG. 15, the first facet 121 of the optical path change element 120D is formed with two protruded positioning portions 121a taking a triangular plate shape in positions not facing the outgoing portions. First side faces 121b and double faces 121c, 121d of the positioning portions 121a are parallel with the mold-release direction (the vertical direction in FIGS. 5 and 6) of the optical path change element 120D. It is preferable that a second side face 121e is orthogonal to the first side face 121b, and the configuration is not, however, limited to this orthogonality.

When the optical path change element 120D according to the embodiment is molded by using the metal molds, the metal molds are previously formed with transfer faces for transfer-molding the positioning portions 121a. However, when the molds are released after the transfer of the optical path change element 120D, the first side faces 121b and the double faces 121c, 121d of the positioning portions 121a are parallel with the mold-release direction of the metal molds, and do not therefore hinder the mold release. On the occasion of positioning the optical path change element 120O at the first optical element, it may be sufficient that the first optical element is provided with recessed portions corresponding to the positioning portions 121a, whereby the highly accurate positioning can be attained. Note that the similar positioning portions may also be provided on the third facet.

Figure 16:
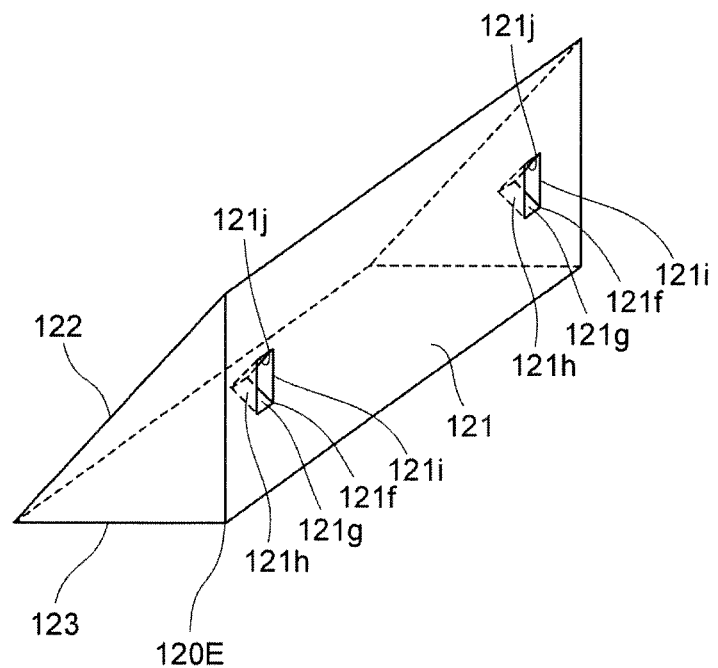
FIG. 16 is a view illustrating an optical path change element 120E by way of yet another modified example applicable to the embodiment.

An optical path change element 120E illustrated in FIG. 16 is configured to omit the reflection faces and the protruded faces. In FIG. 16, the first facet 121 of the optical path change element 120E is formed with two caved positioning portions 121f taking a triangular plate shape in positions not facing the outgoing portions. First side faces 121g and double faces 121h, 121i of the positioning portions 121f are parallel with the mold-release direction (the vertical direction in FIGS. 5 and 6) of the optical path change element 120E. It is preferable that a second side face 121j is orthogonal to the first side face 121g, and the configuration is not, however, limited to this orthogonality.

When the optical path change element 120E according to the embodiment is molded by using the metal molds, the metal molds are previously formed with the transfer faces for transfer-molding the positioning portions 121f. However, when the molds are released after the transfer of the optical path change element 120E, the first side faces 121g and the double faces 121h, 121i of the positioning portions 121f are parallel with the mold-release direction of the metal molds, and do not therefore hinder the mold release. On the occasion of positioning the optical path change element 120E at the first optical element, it may be sufficient that the first optical element is provided with protruded portions corresponding to the positioning portions 121f, whereby the highly accurate positioning can be attained. Note that the similar positioning portions may also be provided on the third facet.

Figure 17:
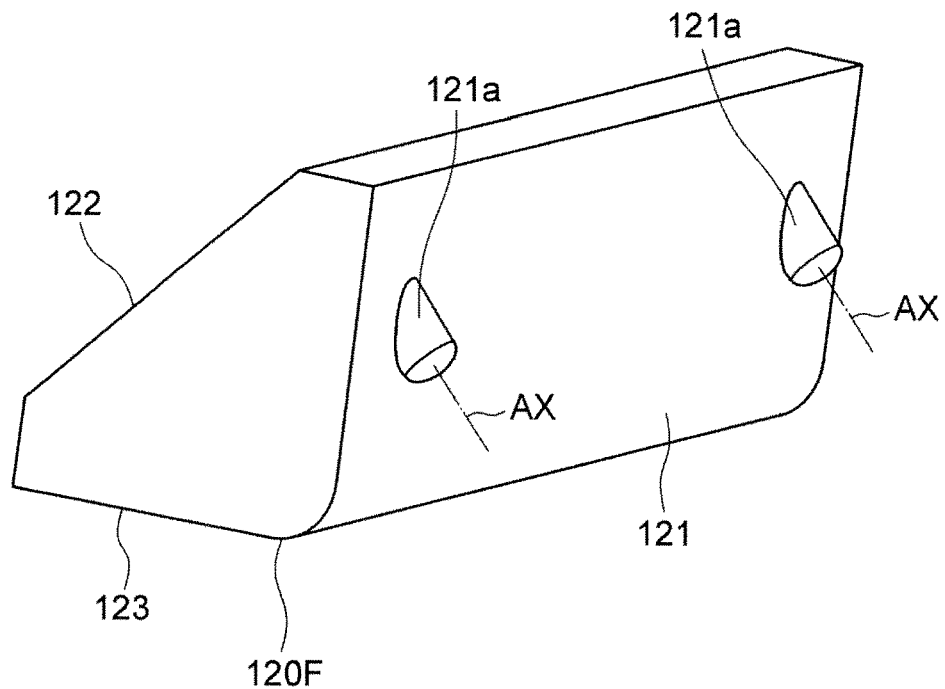
FIG. 17 is a view illustrating an optical path change element 120F by way of a further modified example applicable to the embodiment.

An optical path change element 120F illustrated in FIG. 17 is configured to omit the reflection faces and the protruded faces. In FIG. 17, the first facet 121 of the optical path change element 120F is formed with two cylindrical positioning portions 121a in positions not facing the outgoing portions. Front ends of the positioning portions 121a are chamfered. An axial line AX of the positioning portion 121a is inclined to the first facet 121 but is parallel with the mold release direction (the vertical direction in FIGS. 5 and 6) of the optical path change element 120F.

When the optical path change element 120F according to the embodiment is molded by using the metal molds, the metal molds are previously formed with the transfer faces for transfer-molding the positioning portions 121a. However, when the molds are released after the transfer of the optical path change element 120F, the axial line AX of the positioning portion 121a is parallel with the mold release direction of the metal molds, and does not therefore hinder the mold release. On the occasion of positioning the optical path change element 120F at the first optical element, it may be sufficient that the first optical element is provided with recessed portions (taking a shape similar to a positioning portion 12fa in FIG. 18, which will be described later on) corresponding to the positioning portions 121a to perform the insertion along the axial lines AX, whereby the highly accurate positioning can be attained. Note that the similar positioning portions may also be provided on the third facet.

Figure 18:
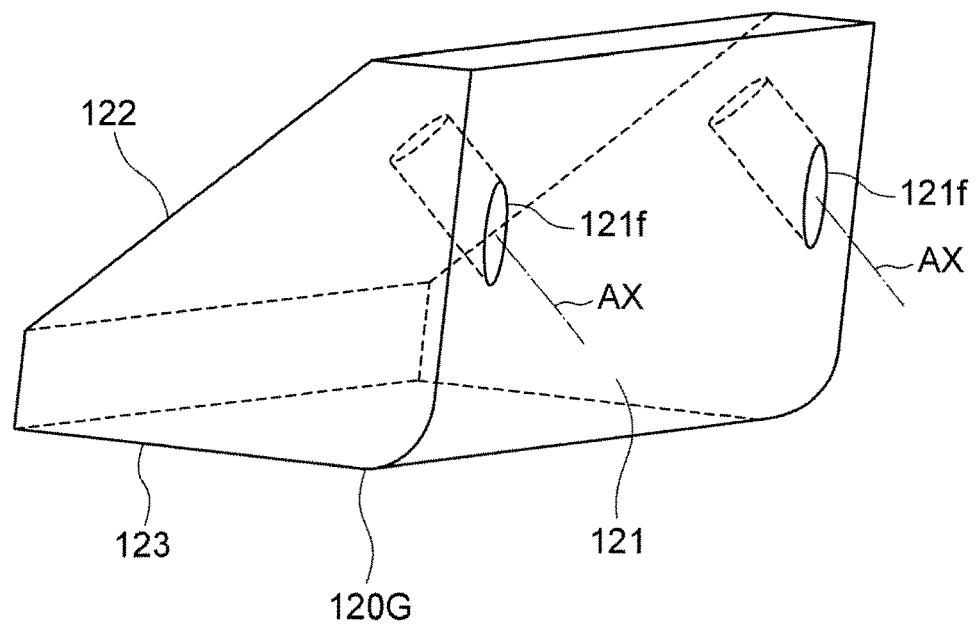
FIG. 18 is a view illustrating an optical path change element 120G by way of a still further modified example applicable to the embodiment.

An optical path change element 120G illustrated in FIG. 18 is configured to omit the reflection faces and the protruded faces. In FIG. 18, the first facet 121 of the optical path change element 120F is formed with two cylindrical positioning portions 121f taking a bag-hole shape in positions not facing the outgoing portions. The axial line AX of the positioning portion 121f is inclined to the first facet 121 but is parallel with the mold release direction (the vertical direction in FIGS. 5 and 6) of the optical path change element 120G.

When the optical path change element 120G according to the embodiment is molded by using the metal molds, the metal molds are previously formed with the transfer faces for transfer-molding the positioning portions 121f. However, when the molds are released 120G, the axial line AX of the positioning portion 121f is parallel with the mold release direction of the metal molds, and does not therefore hinder the mold release. On the occasion of positioning the optical path change element 120G at the first optical element, it may be sufficient that the first optical element is provided with protruded portions (taking a shape similar to the positioning portion 121a in FIG. 17) corresponding to the positioning portions 121f to perform the insertion along the axial lines AX, whereby the highly accurate positioning can be attained. Note that the similar positioning portions may also be provided on the third facet.

Figure 19:
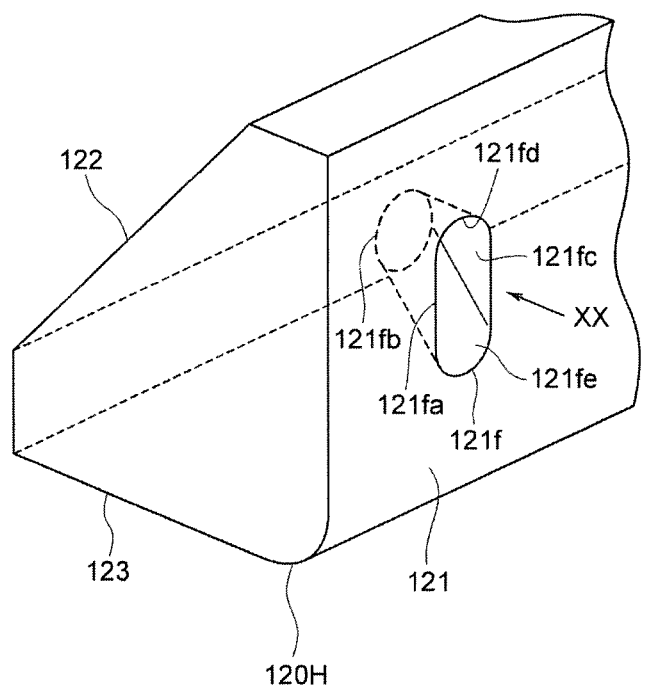
FIG. 19 is a perspective view illustrating an optical path change element 120H by way of a yet further modified example applicable to the embodiment.
Figure 20:
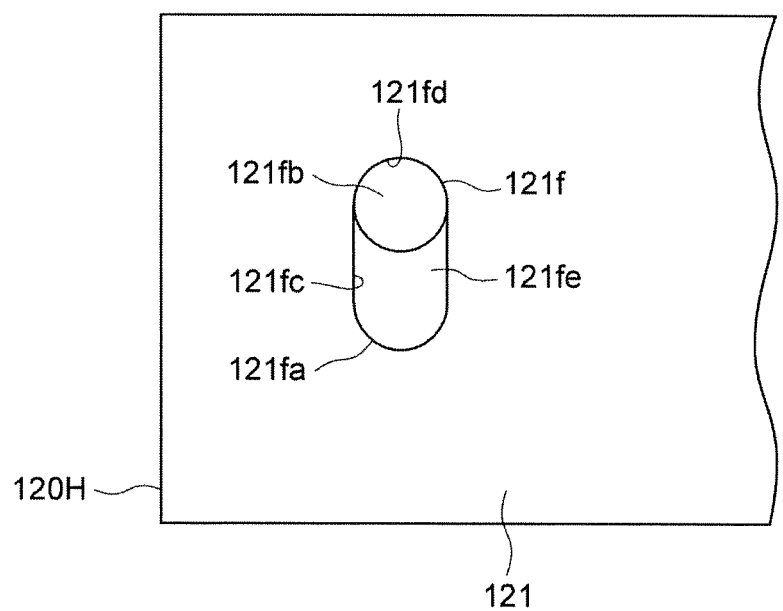
FIG. 20 is a rear view illustrating the optical path change element 120H by way of a yet further modified example applicable to the embodiment.

An optical path change element 120H illustrated in FIGS. 19 and 20 is configured to omit the reflection faces and the protruded faces. In the drawings, though only one side is depicted, the first facet 121 of the optical path change element 120H is formed with two positioning portions 121f taking the same recessed shape in positions not facing the outgoing portions. The positioning portion 121f has such a shape as to connect an elongate circular inlet port 121fa to a circular bottom face 121fb through a side wall 121fc. The side wall 121fc has an upper semi-cylindrical face 121fd and a lower semi-cylindrical face 121fe. The upper semi-cylindrical face 121fd is orthogonal to the first facet 121, and the lower semi-cylindrical face 121fe is parallel with the mold release direction (the vertical direction in FIGS. 5 and 6) of the optical path change element 120H.

When the optical path change element 120H according to the embodiment is molded by using the metal molds, the metal molds are previously formed with the transfer faces for transfer-molding the positioning portions 121f. However, when the molds are released after the transfer of the optical path change element 120H, the lower semi-cylindrical face 121fe of the side wall 121fc is parallel with the mold release direction of the metal molds, and does not therefore hinder the mold release. On the occasion of positioning the optical path change element 120H at the first optical element, it may be sufficient that the first optical element is provided with protruded portions (e.g., a cylindrical portions orthogonal to the first facet 121) corresponding to the positioning portions 121f to perform the insertion along the upper semi-cylindrical face 121fd, whereby the highly accurate positioning can be attained. Note that the similar positioning portions may also be provided on the third facet.

Figure 21A:
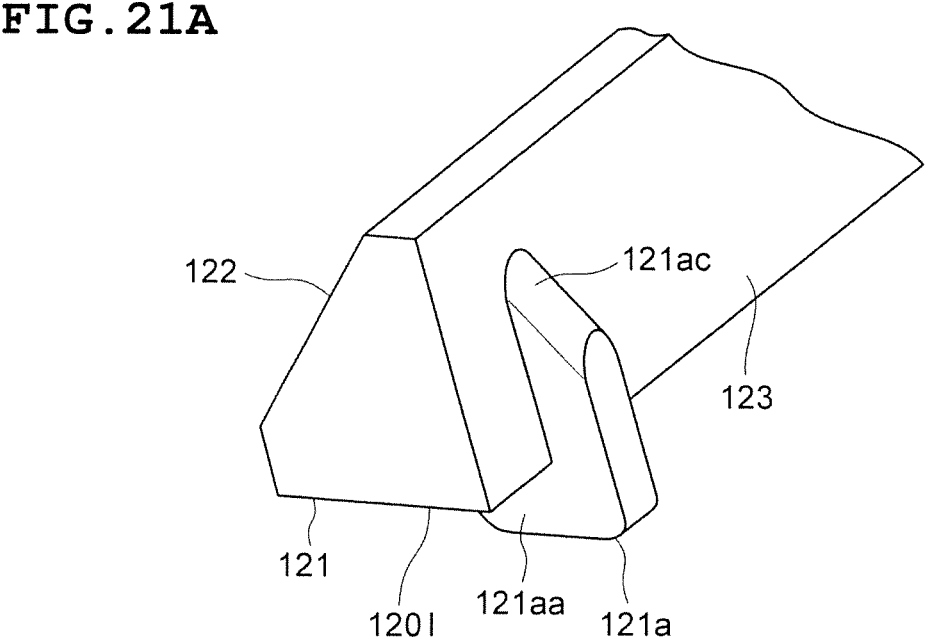
FIG. 21 is a view illustrating an optical path change element 120I by way of a yet further modified example applicable to the embodiment.
Figure 21B:
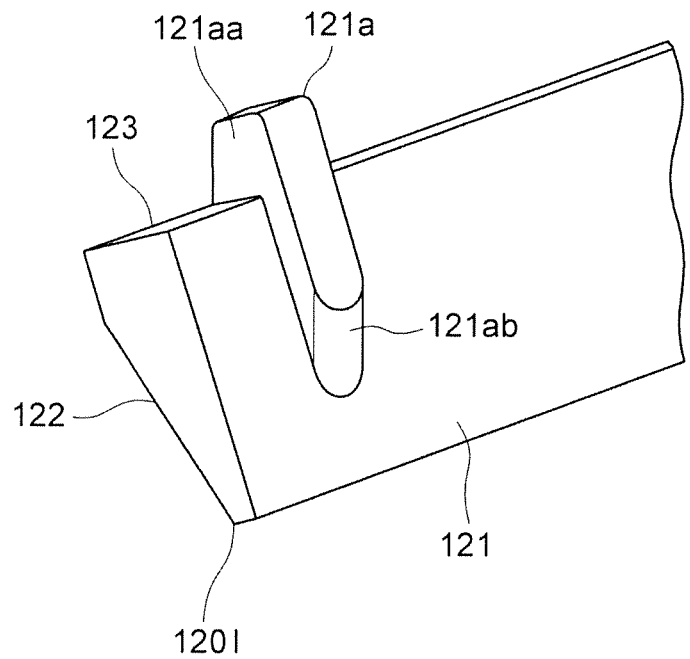

An optical path change element 120I illustrated in FIG. 21 is configured to omit the reflection faces and the protruded faces. FIG. 21(a) is a view illustrating the optical path change element 120I as viewed from the third facet 123; and FIG. 21(b) is a view illustrating the optical path change element 120I as viewed from the first facet 121. In FIG. 21, the optical path change element 120I is formed with two integrally-protruded positioning portions 121a (only one positioning portion 121a is illustrated) in the way of sitting astride of the first facet 121 and the third facet 123 in positions not facing the outgoing portions and the incident portions. The positioning portion 121a includes: a side face 121aa taking substantially an L-shape orthogonal to the first facet 121 and the third facet 123; a first semi-cylindrical face 121ab inclined to the first facet 121; and a second semi-cylindrical face 121ac inclined to the third facet 123. The first semi-cylindrical face 121ab and the second semi-cylindrical face 121ac are parallel with the mold release direction (the vertical direction in FIGS. 5 and 6) of the optical path change element 120I.

When the optical path change element 120I according to the embodiment is molded by using the metal molds, the metal molds are previously formed with the transfer faces for transfer-molding the positioning portions 121a. However, when the molds are released after the transfer of the optical path change element 120I, the first semi-cylindrical face 121ab and the second semi-cylindrical face 121ac of the positioning portion 121a are parallel with the mold release direction of the metal molds, and do not therefore hinder the mold release. On the occasion of positioning the optical path change element 120I at the first optical element and the second optical element, it may be sufficient that the first and second optical elements are provided with the recessed portions corresponding to the positioning portions 121a, whereby the highly accurate positioning can be attained.

Figure 22A:
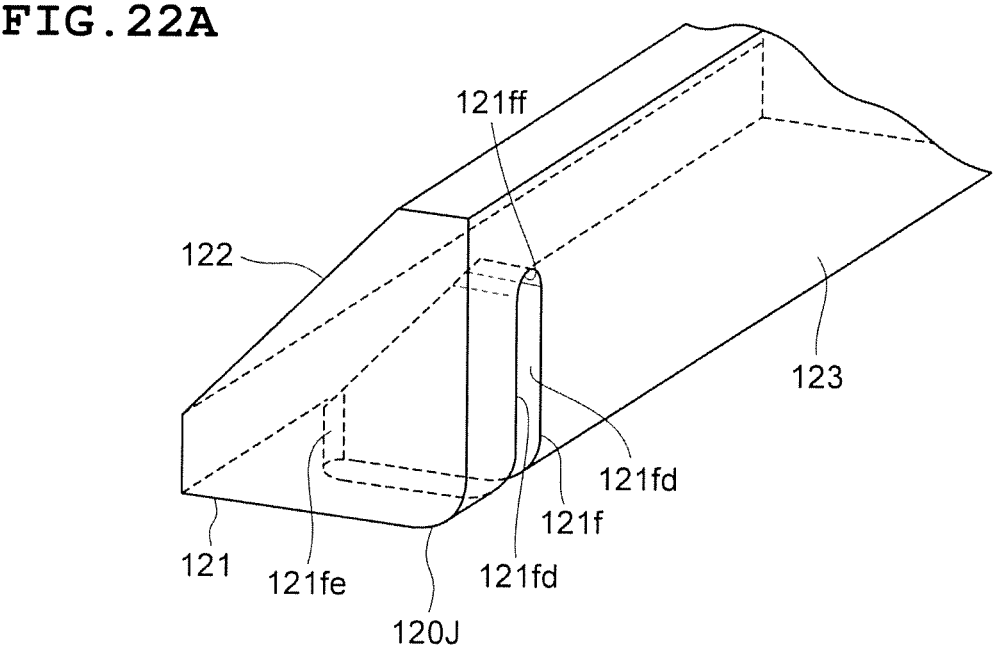
FIG. 22 is a view illustrating an optical path change element 120J by way of an additional modified example applicable to the embodiment.
Figure 22B:
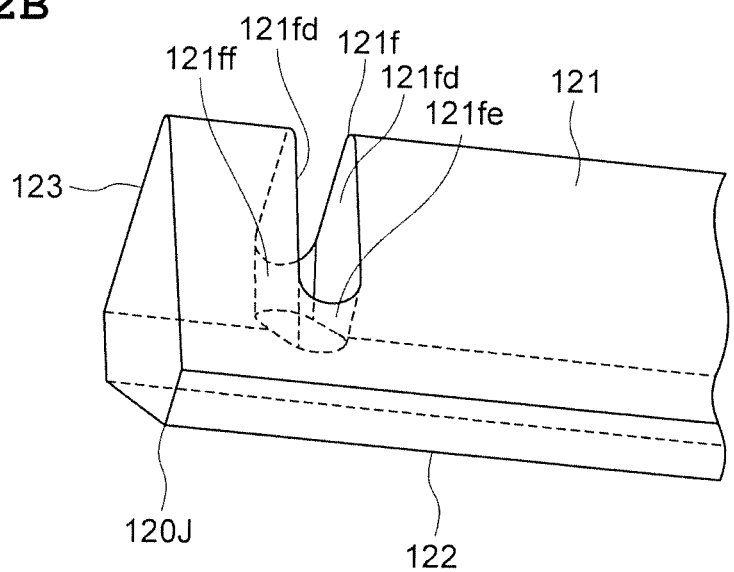

An optical path change element 120J illustrated in FIG. 22 is configured to omit the reflection faces and the protruded faces. FIG. 22(a) is a view illustrating the optical path change element 120J as viewed from the third facet 123; and FIG. 22(b) is a view illustrating the optical path change element 120J as viewed from the first facet 121. In FIG. 22, the optical path change element 120J is formed with two positioning portions 121f (only one positioning portion 121a is illustrated) notched in the triangular plate shape in the way of sitting astride of the first facet 121 and the third facet 123 in positions not facing the outgoing portions and the incident portions. The positioning portion 121*f* includes: a substantially triangular side face 121*fd* orthogonal to the first facet 121 and the third facet 123; a first semi-cylindrical face 121*fe* orthogonal to the first facet 121; and a second semi-cylindrical face 121*ff* orthogonal to the third facet 123.

When the optical path change element 120J according to the embodiment is molded by using the metal molds, the metal molds are previously formed with the transfer faces for transfer-molding the positioning portions 121*f*. However, when the molds are released after the transfer of the optical path change element 120J, the side face 121*fd* of the positioning portion 121*f* is parallel with the mold release direction of the metal molds, and does not therefore hinder the mold release. On the occasion of positioning the optical path change element 120J at the first optical element and the second optical element, it may be sufficient that the first optical element is provided with the cylindrical portion engaging with the first semi-cylindrical face 121*fe* of the positioning portion 121*a*, and the second optical element is provided with the cylindrical portion engaging with the second semi-cylindrical face 121*ff* of the positioning portion 121*a*, whereby the highly accurate positioning can be attained.

Exemplary modes of the optical path change element will hereinafter be described as a whole.

It is preferable that at least light passage areas of the first facet and the third facet are flat in the optical path change element.

The optical path change element of Patent Document 1 includes the convex condenser lens surface provided on the light incident surface. Accordingly, ensuring optimal coupling efficiency in the optical path change element entails positioning the convex lens surface and light incident/outgoing ends at high accuracy, and requires a labor for assembling. It is also considered that Patent Document 1, for overcoming this positioning difficulty, has a scheme of ensuring a distance between the light incident portion and the convex lens surface at the high accuracy by arranging the convex lens surface on a deeper side by one stage and abutting the lower surface on the upper surface of the optical module, thereby avoiding direct interference with the light incident end and the convex lens surface. However, this intricate concavo-convex configuration is provided on the light incident surface or outgoing surface, and hence such a problem arises as to increase a cost due to a metal mold structure becoming intricate with occurrence of a necessity for minutely segmenting the metal molds in the case of molding the optical path change element of Cited Document 1 by using the metal molds. In Patent Document 1, it is necessary for exhibiting a converging function to invariably provide a gap corresponding to a focal length of the convex lens surface between the convex lens surface and the light incident end. This causes an apprehension about a decrease in coupling efficiency due to a partial reflection of the light beams entering the convex lens surface.

By contrast, according to the mode described above, the first facet and the third facet are flat, and hence, when molding the optical path change element by using the metal molds, the configuration of the metal molds can be simplified such as transferring the first facet and the third facet by using the single type of molds. The optical path change element itself can be also downsized because of the first facet and the third facet not including the protruded faces. In addition, the first facet and the third facet are flat, and hence there is an advantage of facilitating the butt joint. The installation can be attained by abutting the outgoing portions of the first optical element on the first facet and further abutting the incident portions of the second optical element on the third facet. It is therefore feasible to keep high the coupling efficiency by restraining the light reflections on the first facet and the third facet and to reduce the interval between the first facet and the first optical element and the interval between the third facet and the second optical element, thereby contributing to the downsizing. Particularly the contribution to the downsizing in a direction of stacking the boards can be made, thereby enabling a suitable use in the case of stacking the boards. Further, the distances along the optical axes from the reflection face to the outgoing portion and from the reflection face to the incident portion can be ensured at the high accuracy by abutting the outgoing portion of the first optical element on the first face and abutting the incident portions of the second optical element on the third facet. Hence, the light beams diverging from the outgoing portions are highly accurately converged through the reflection faces, thereby enabling the downsizing of the optical coupling device to be attained while ensuring the high coupling efficiency. However, the first facet may be disposed so as to be spaced from the outgoing portions of the first optical element within a range enabling the practical coupling efficiency to be kept, and the third facet may also be disposed so as to be spaced from the incident portions of the second optical element within the same range as above.

It is preferable that the virtual plane is parallel with the tangent plane at the point on the optical axis of the reflection face. A height of the protruded face can be thereby decreased to contribute to the downsizing. In the case of forming a functional film, it is feasible to restrain such an apprehension that the protruded face forms a shadow on the reflection face when forming the film, and to form a more uniform film than normal.

It is also preferable to be molded of the resin. The resin molding enables the optical path change element having the highly accurate shape to be mass-produced at a low cost. Especially when using the resin as a material for holding the first optical element and/or the second optical element, a deviation of the optical axis is hard to occur because of closeness between a contraction degree and an expansion degree due to a change in environment, thereby enabling minimization of a decrease in optical coupling efficiency.

It is further preferable to be molded of the glass. The glass molding enables the optical path change element to be provided, which can exhibit the coupling efficiency being stable against the change in environment.

It is preferable that the first optical element is the optical fibre, and the second optical element is also the optical fibre. The light beams transmitted from the optical fibre can be further transmitted to another optical fibre via the optical path change element. As stated above, the general type of optical fibres are prescribed in terms of an allowable bending minimum diameter in order to ensure the light transmission efficiency. Therefore, when the minimum diameter or smaller is requested in terms of a concern about saving a space, there is a possibility that the general type of optical fibres are unusable. However, one or more embodiments of the present invention enable the more efficient receipt of the components than normal, while keeping the light transmission efficiency.

It is preferable that the first optical element is the optical fibre, and the second optical element is a light receiving element. The light beams transmitted from the optical fibre can be received by the light receiving element via the optical path change element. The light receiving element is exemplified by a photo diode but is not limited to this photo diode.

It is preferable that the first optical element is a light emitting element, and the second light element, and the first optical element is the optical fibre. The light beams emitted from the light emitting element can be transmitted to the optical fibre via the optical path change element. The light emitting element is exemplified by a semiconductor laser and a Vertical Cavity Surface Emitting Laser (which will hereinafter be abbreviated to VCSEL) diode but is not limited to these elements.

It is preferable that the light beams getting incident on the reflection face are totally reflected. The reflection face is configured to satisfy a condition for the total reflection, whereby the reflection efficiency can be enhanced.

It is also preferable that the reflection film having a reflectivity equal to or larger than 90% is formed on the reflection face. The sufficient reflectivity can be ensured even by a configuration that the reflection face does not satisfy the condition for the total reflection. Such a reflection film may involve using aluminum, gold, silver, compounds of these metals, and dielectrics. It is also preferable that an untransparent reflection film on the assumption that a wave surface is disordered due to a problem of contamination and other equivalent problems. Note that the reflectivity equal to or larger than 90% connotes an average reflectivity of usage wavelengths. Normally, wavelengths of 0.8 um through 1.7 um are used in the field of optical communications.

Let "A" be the distance along the optical axis from the first facet to the reflection face or the distance along the optical axis from the third facet to the reflection face and "B" be the distance from the point on the optical axis of the reflection face to the virtual plane, and it is preferable to satisfy the following mathematical expression:

$$B/A < 1.0 \tag{1}$$

The mathematical expression (1) being thus satisfied, the cover member is not excessively separated from the reflection faces even by providing the cover member along the virtual plane, and hence the size of the optical path change element inclusive of the cover member can be restrained small, resulting in being suited particularly to the optical coupling device. The mathematical expression (1) being thus satisfied, the height of the protruded face can be reduced. Therefore, in the case of forming the functional film on the reflection face, it is feasible to further restrain the apprehension that the protruded face forms the shadow on the reflection face when forming the film, and to form a by far more uniform film than normal. Note that it is desirable to satisfy a mathematical expression in terms of efficiently reflecting the light beams outgoing from the outgoing portions toward the incident portions, attaining the downsizing, and avoiding the apprehension that the cover member contacts the reflection faces to cause a change in optical performance, the expression being given as follows:

$$0.01 < B/A < 0.7 \tag{1'}$$

It is further preferable that the first face and/or the third facet is formed with the positioning portion for positioning the first optical element and the optical path change element. The first optical element and the optical path change element can be thereby positioned at the high accuracy without making a complicated adjustment. It is still further preferable that the positioning portion exists in a longitudinal direction of the optical path change element.

It is preferable that the second face is formed with the plurality of reflection faces; the first optical element includes the plurality of outgoing portions corresponding to the plurality of reflection faces; and the second optical element includes the plurality of incident portions corresponding to the plurality of reflection faces. A large quantity of information can be thereby transmitted by way of the optical transmission using the optical path change element according to one or more embodiments of the present invention.

It is preferable that the second facet is formed with the plurality of reflection faces; the plurality of reflection faces is aligned in the direction orthogonal to the plane containing the two optical axes passing through one reflection face; the first optical element includes the plurality of outgoing portions aligned at the same intervals as those of the plurality of reflection faces; and the second optical element includes the plurality of incident portions aligned at the same intervals as those of the plurality of reflection faces. The large quantity of information can be thereby transmitted by way of the optical transmission using the optical path change element according to one or more embodiments of the present invention.

It is also preferable that the protruded faces are formed on both sides between which at least the reflection faces are pinched. This configuration facilitates the installation of the cover member on the protruded face to exhibit an excellent assembling property.

It is further preferable that the virtual plane is formed only on the protruded faces. The downsizing of the optical path change element can be thereby attained when the cover member is installed on the protruded face.

Next, an exemplary mode of the optical coupling device will be described.

In the optical coupling device described above, it is preferable to include the cover member attached to the optical path change element by being superposed on the virtual plane. The optical coupling device can be restrained small in the state of providing the cover member along the virtual plane.

It is also preferable that the reflection faces of the optical path change element are disposed within the hermetic space by attaching the cover member to the optical path change element. The reflection faces can be protected from an external environment by using the cover member, whereby the stable coupling efficient can be exhibited over a long period.

It is apparent to those skilled in the art from the embodiments and the technical ideas described in the present specification that the present invention is not limited to the embodiment described in the present specification but encompass other embodiments and modified examples. For example, the space containing the reflection faces can be hermetically sealed by filling a gap between the cover member and the optical path change element with a light-shield bonding agent and other equivalent agents in a state of abutting the plate-shaped cover member on a boss. In this case, it is desirable that the reflection films are formed on the reflection faces.

REFERENCE SIGNS LIST 100, 100', 100" Optical coupling device
110 Optical module
111 Base plate
112 Semiconductor laser
113 Pin
120, 120A-120J Optical path change element
121 First face
121a Positioning portion 121b First side face
121c, 121d Double face
121e Second side face
121f Positioning portion
121g First side face
121h, 121i Double face
121j Second side face
122 Second facet
122A Boss
122C Protruded face
122a Reflection face
122 Linking face
122c Protruded face
122d Inclined face
123 Third facet
125 Cover member
130, 130A, 130B Optical connector
131 Body unit
131a Recessed portion
131V Vertical portion
131H Horizontal portion
131a Recessed portion
131b, 131b' Insertion hole
131c, 131c' Through-hole
131d Bottom face
131e Lower face
131f Circular opening
131g Inclined face
132, 132' Optical fibre
132a, 132a' Protecting portion
132b, 132b' Fibre strand
CY1 Large cylinder
CY2 Small cylinder
GL Glass
GLr Unnecessary glass
MD1 First mold
MD1a First inclined face
MD1b Second inclined face
MD2 Second mold
MD2a Optical face transfer face
MD2b Linking face transfer face
MD2c Protruded face transfer face
OA1, 0A2 Optical axis
PT Point
VP Virtual plane

The invention claimed is:

1. An optical path change element configured to perform optical coupling between a first optical element including outgoing portions of light beams and a second optical element including incident portions of the light beams, comprising:
   a first facet receiving incidence of the light beams outgoing from the outgoing portions of the first optical element;
   a second facet comprising:
      a reflection face with a predetermined radius of curvature to reflect the incident light beams from the first facet;
      a flat linking face formed along peripheries of the reflection face; and
      protruded faces that protrude from the flat linking face to a height greater than a height of the reflection face,
   a third facet causing the light beams reflected on the reflection face to outgo to the incident portions of the second optical element,
   wherein virtual planes are defined tangent to the protruded faces, and at least one of the virtual planes covers the reflection face without being tangent to the reflection face and is parallel with and spaced apart from a tangent plane at an arbitrary point of the reflection face.

2. The optical path change element according to claim 1, wherein at least light passage areas of the first facet and the third facet are flat.

3. The optical path change element according to claim 1, wherein the virtual planes are parallel with the tangent plane at a point on an optical axis of the reflection face.

4. The optical path change element according to claim 1, wherein the optical path change element is molded of a resin.

5. The optical path change element according to claim 1, wherein the optical path change element is molded of a glass.

6. The optical path change element according to claim 1, wherein the first optical element is an optical fibre, and the second optical element is also the optical fibre.

7. The optical path change element according to claim 1, wherein the first optical element is the optical fibre, and the second optical element is a light receiving element.

8. The optical path change element according to claim 1, wherein the first optical element is a light emitting element, and the second optical element is the optical fibre.

9. The optical path change element according to claim 1, wherein the light beams incident on the reflection faces are totally reflected.

10. The optical path change element according to claim 1, wherein a reflection film having a reflectivity equal to or larger than 90% is formed on the reflection face.

11. The optical path change element according to claim 1, wherein let "A" be a distance along the optical axis from the first facet to the reflection face or a distance along the optical axis from the third facet to the reflection face and "B" be a distance from the point on the optical axis of the reflection face to the virtual plane, and the following mathematical expression is satisfied:

$$B/A < 1.0 \tag{1}$$

12. The optical path change element according to claim 1, wherein the first facet and/or the third facet is formed with positioning portions to position the first optical element and the optical path change element.

13. The optical path change element according to claim 12, wherein the positioning portions exist in a longitudinal direction of the optical path change element.

14. The optical path change element according to claim 1, wherein
   the second facet is formed with a plurality reflection faces,
   the first optical element includes a plurality of outgoing portions corresponding to the plurality of reflection faces, and
   the second optical element includes a plurality of incident portions corresponding to the plurality of reflection faces.

15. The optical path change element according to claim 1, wherein
   the second facet is formed with a plurality of reflection faces,
   the plurality of reflection faces are aligned in a direction orthogonal to a plane containing two optical axes passing through one reflection face,
   the first optical element includes a plurality of outgoing portions aligned at the same intervals as those of the plurality of reflection faces, and the second optical element includes a plurality of incident portions aligned at the same intervals as those of the plurality of reflection faces.

16. The optical path change element according to claim 1, wherein the protruded faces are formed on both sides between which at least the reflection faces are pinched.

17. The optical path change element according to claim 1, wherein the virtual planes are formed only on the protruded faces.

18. An optical coupling device comprising:
the optical path change element according to claim 1; and
an attachable/detachable optical connector connecting the optical path change element to the first optical element and/or the second optical element in an optical coupling enabled manner.

19. The optical coupling device according to claim 18, further comprising a cover member being attached to the optical path change element by being superposed on the virtual planes.

20. The optical coupling device according to claim 19, wherein the reflection faces of the optical path change element are disposed within a hermetic space by attaching the cover member to the optical path change element.

* * * * *